United States Patent
Nakayasu et al.

(10) Patent No.: US 6,609,367 B2
(45) Date of Patent: Aug. 26, 2003

(54) EXHAUST CONTROL VALVE

(75) Inventors: Tetsuya Nakayasu, Saitama (JP); Mikio Sagara, Saitama (JP); Kyo Takahashi, Saitama (JP); Noritoshi Iwase, Saitama (JP); Hajime Yamada, Saitama (JP); Atsushi Murakami, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/820,683

(22) Filed: Mar. 30, 2001

(65) Prior Publication Data

US 2001/0035009 A1 Nov. 1, 2001

(30) Foreign Application Priority Data

Mar. 31, 2000 (JP) .................................... 2000-101331
Sep. 18, 2000 (JP) .................................... 2000-282550

(51) Int. Cl.⁷ ............................................. F01N 7/00
(52) U.S. Cl. .................. 60/324; 137/625.19; 251/214; 251/305
(58) Field of Search .................. 60/288, 313, 324; 123/337, 399; 137/625.19; 251/214, 172, 305, 306, 308; 384/218, 271; 403/30

(56) References Cited

U.S. PATENT DOCUMENTS

| | | | | |
|---|---|---|---|---|
| 3,319,098 A | * | 5/1967 | Hartman | 384/271 |
| 3,598,363 A | * | 8/1971 | Shaw | 251/172 |
| 4,524,946 A | * | 6/1985 | Thompson | 251/214 |
| 4,632,590 A | * | 12/1986 | Tsuchimoto | 403/30 |
| 4,809,659 A | * | 3/1989 | Tamaki et al. | 123/399 |
| 4,877,339 A | * | 10/1989 | Schuster et al. | 384/218 |
| 4,940,208 A | * | 7/1990 | Kemp | 251/214 |
| 5,401,001 A | * | 3/1995 | Cook et al. | 251/308 |
| 5,490,487 A | * | 2/1996 | Kato et al. | 123/399 |
| 5,503,367 A | * | 4/1996 | Thompson et al. | 251/214 |
| 5,630,571 A | * | 5/1997 | Kipp et al. | 251/214 |
| 5,736,635 A | * | 4/1998 | Onodera | 123/337 |
| 5,771,690 A | * | 6/1998 | Kakizaki et al. | 60/288 |
| 6,076,831 A | * | 6/2000 | Pfannenschmidt | 251/214 |
| 6,193,214 B1 | * | 2/2001 | Schatz | 251/305 |
| 6,273,058 B1 | * | 8/2001 | Wagner | 251/214 |

FOREIGN PATENT DOCUMENTS

| JP | A63212728 | | 9/1988 |
|---|---|---|---|
| JP | 2-37110 | * | 2/1990 |
| JP | 2-75721 | * | 3/1990 |

* cited by examiner

Primary Examiner—Thomas Denion
Assistant Examiner—Tu M. Nguyen
(74) Attorney, Agent, or Firm—Birch, Stewart, Kolasch & Birch, LLP

(57) ABSTRACT

In an exhaust control valve having a valve housing and a valve body rotatably contained in the valve housing, a transmission member is fitted to an outer end of the valve shaft and protrudes from the outside of the valve housing. A bearing bushing for rotatably bearing an external circumferential surface of the valve shaft by its internal circumferential surface and rotatably bearing an end face of the valve body by its end face is mounted in the valve housing. The valve body is urged by load from a thrust spring for achieving a pressure contact seal condition between the opposed end faces of the bearing bush and the valve body.

25 Claims, 20 Drawing Sheets

EXHAUST CONTROL VALVE

CROSS-REFERENCE TO RELATED APPLICATIONS

This nonprovisional application claims priority under 35 U.S.C. § 119(a) on Application No. 2000-101331 filed in Japan on Mar. 31, 2000, and Application No. 2000-282550 filed in Japan on Sep. 18, 2000.

BACKGROUND OF THE INVENTION

1. Field of the Invention

The present invention relates to an exhaust control valve, and more particularly to an exhaust control valve controlling the flow of exhaust gas from an internal combustion engine of a vehicle.

2. Background Art

An exhaust valve in which a bearing bushing for rotatably bearing a valve shaft and a seal member adjacent to the bearing bushing and making close contact with an external circumferential surface of the valve shaft are mounted in a valve housing has been taught by the background art. Japanese Pre-examination Patent Publication (KOKAI) No. 63-212728 (1988) shows an exemplary arrangement of this type of exhaust control valve.

However, these types of exhaust control valve suffer from the following disadvantages. Since a bearing bushing and a seal member are both utilized, the number of component parts is increased. In addition, each of the bearing bushing and the seal member(s) provided exclusive functions. Finally, the seal member(s) are expensive, and therefore making it difficult to reduce construction costs.

SUMMARY OF THE INVENTION

The present invention overcomes the shortcomings associated with the conventional art and achieves other advantages not realized by conventional art.

An aspect of the present invention is to provide an exhaust control valve reducing the number of component parts.

An additional aspect of the present invention is to providing an inexpensive bearing bushing that provides a sealing function in an exhaust control valve.

These and other aspects of the present invention are accomplished by an exhaust control valve for an internal combustion engine for a vehicle comprising a valve housing having a valve chamber; a valve body rotatably contained in the valve chamber and cooperatively engaged with the valve housing for controlling a flow of exhaust gas;

a rotating transmission member drivingly engaging at least one valve shaft of the valve body, the transmission member secured to an outer end of the at least one valve shaft protruding from an exterior of the valve housing; a bearing bushing for rotatably bearing an external circumferential surface of the valve shaft by an internal circumferential surface of the bearing bushing, the bearing bushing rotatably bearing an end face of the valve body; and a spring operatively engaged with the valve body and maintaining a pressure contact seal condition between a pair of opposed end faces of the bearing bushing and the valve body.

According to a first feature of the present invention, a bearing bushing can be provided that offers a bearing function and a sealing function. Therefore, leakage of exhaust gas from the vicinity of a valve shaft can be prevented without providing a special seal member. Further, a reduction in cost can be achieved as expensive seal members are eliminated and the number of component parts is reduced.

In addition, since seal members are not used, it is possible to use a bearing bushing that is relatively long in its axial direction. Accordingly, a bearing shaft can be supported with a larger supporting surface/region, thereby ensuring a large bearing capacity. Therefore, the bearing bush can display superior durability even though it receives load directly from a driven pulley fitted to the valve shaft.

According to a second feature of the present invention, the nonmetallic bearing bushing displays a good sealing function and absorbs vibrations in the thrust direction of the valve body arising from exhaust pulsations. Accordingly, the generation of abnormal noise is further suppressed.

Furthermore, the invention has a third feature whereby the valve body is formed from a titanium material together with its valve shafts, while the bearing bushes are formed from a carbon material.

According to this third feature, the valve body is formed from a titanium material together with its valve shafts, whereby it is therefore possible to achieve a reduction in the weight of the valve body and, hence, the exhaust control valve. Although the titanium material of the valve body as a whole is an active metal, and has a high tendency toward seizure, the adoption of the bearing bushing formed from a carbon material makes it possible to give achieve rotational slidability between the valve shafts and the bearing bushings even in high-temperature conditions. This, in cooperation with the reduction of weight of the valve body, makes it possible to effectively enhance the response property of the valve body to driving torque.

These and other aspects of the present invention are further accomplished by An exhaust control system for an internal combustion engine of a vehicle comprising a plurality of exhaust pipes each having an intermediate portion; an exhaust gas muffler operatively connected to the exhaust pipes; a valve housing disposed in the intermediate portion of the exhaust pipes and having a valve chamber; a valve body rotatably contained in the valve chamber and cooperatively engaged with the valve housing for controlling a flow of exhaust gas; a rotating transmission member drivingly engaging at least one valve shaft of the valve body, the transmission member secured to an outer end of the at least one valve shaft protruding from an exterior of the valve housing; a bearing bushing for rotatably bearing an external circumferential surface of the valve shaft by an internal circumferential surface of the bearing bushing, the bearing bushing rotatably bearing an end face of the valve body; and a thrust spring operatively engaged with the valve body and maintaining a pressure contact seal condition between a pair of opposed end faces of the bearing bushing and the valve body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BRIEF DESCRIPTION OF THE PREFERRED EMBODIMENTS

The present invention will now be described with reference to the embodiments illustrated by the accompanying drawings.

Figure 1:
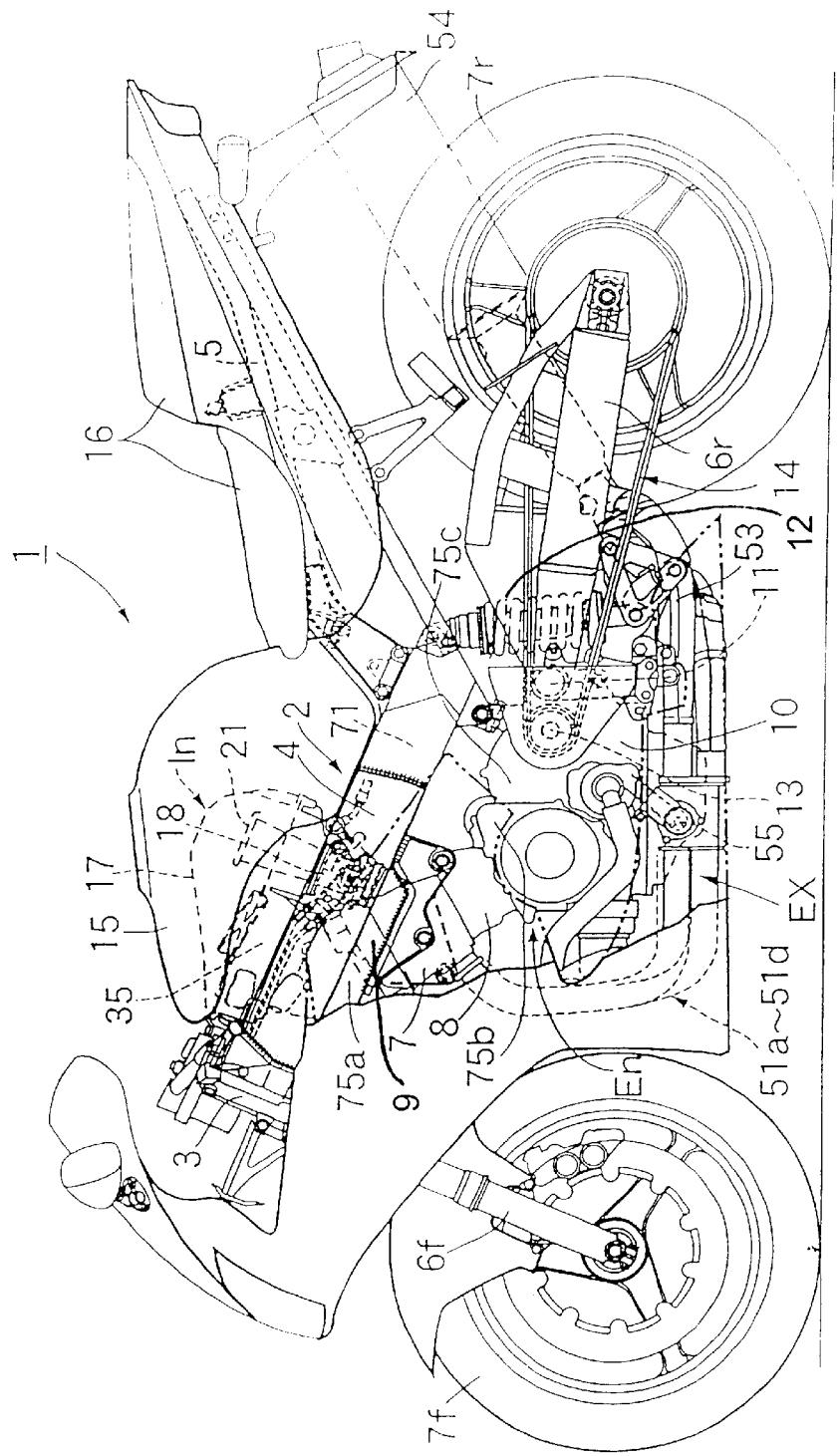
FIG. 1 is a side view of a motorcycle with an engine having an intake control device and an exhaust control device.
Figure 2:
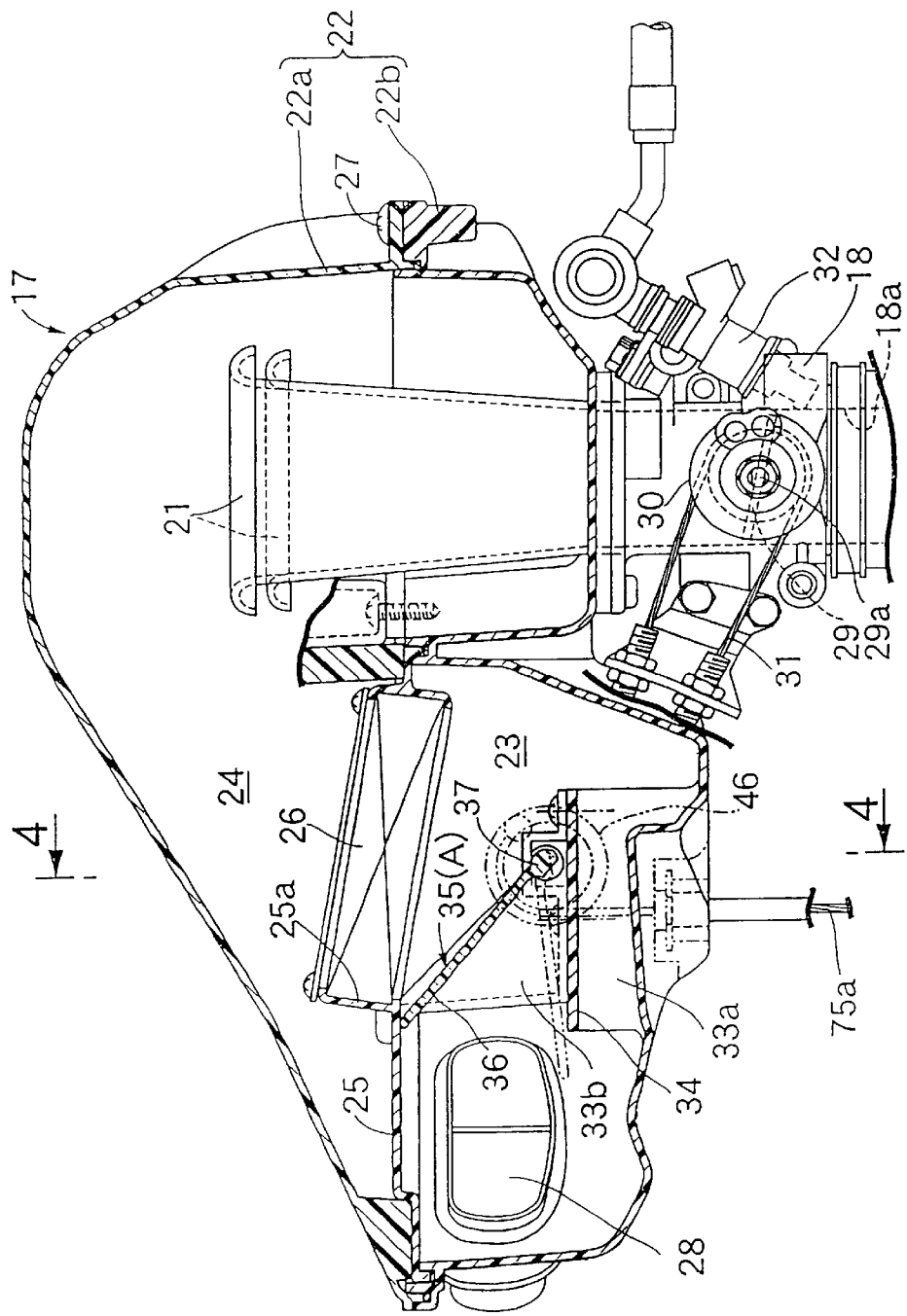
FIG. 2 is a vertical sectional side view of a portion of an intake control device according to an embodiment of the present invention.
Figure 3:
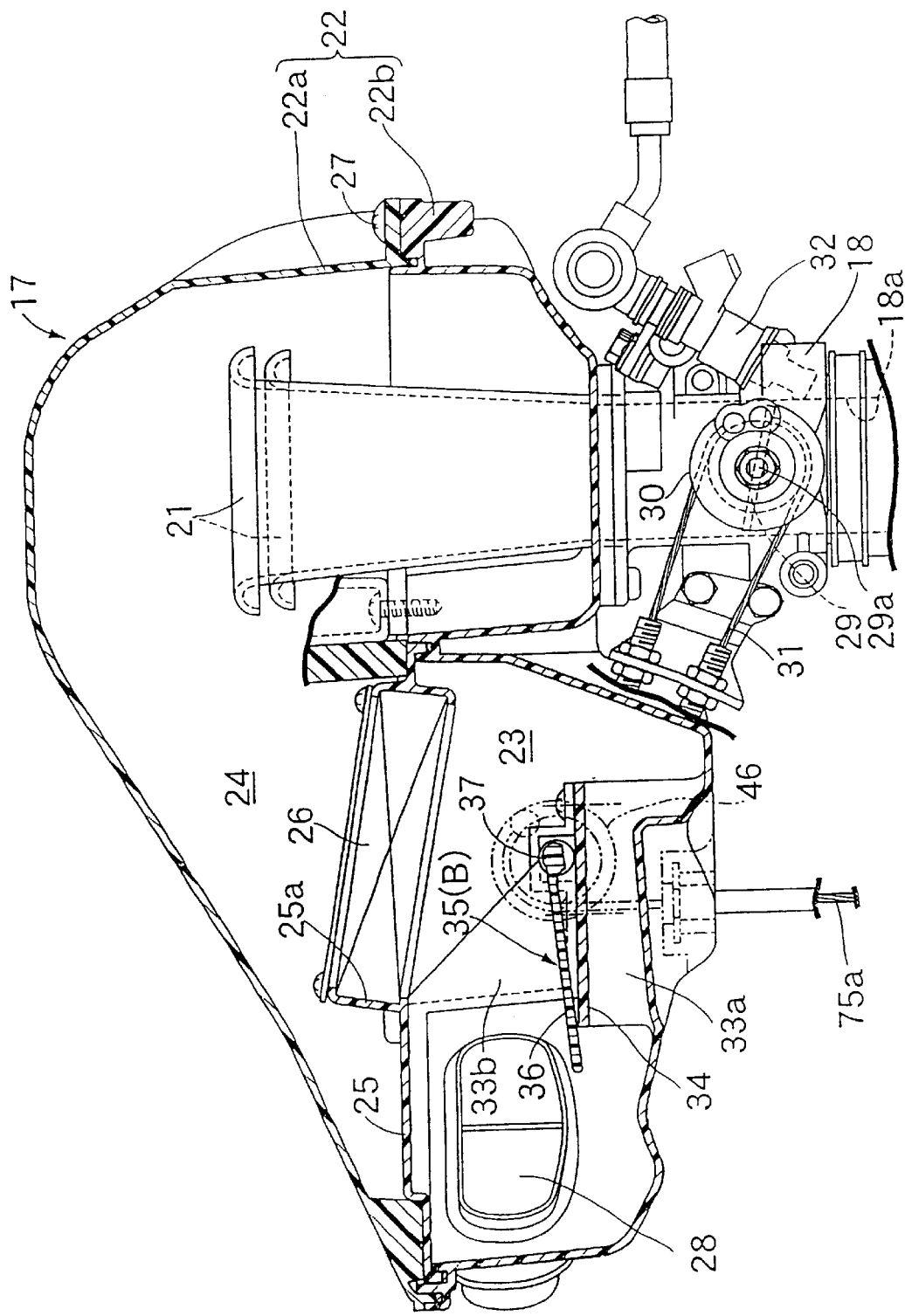
FIG. 3 is a vertical sectional side view of a portion of an intake control device according to an embodiment of the present invention and corresponding to a different operational position than that of FIG. 2.
Figure 4:
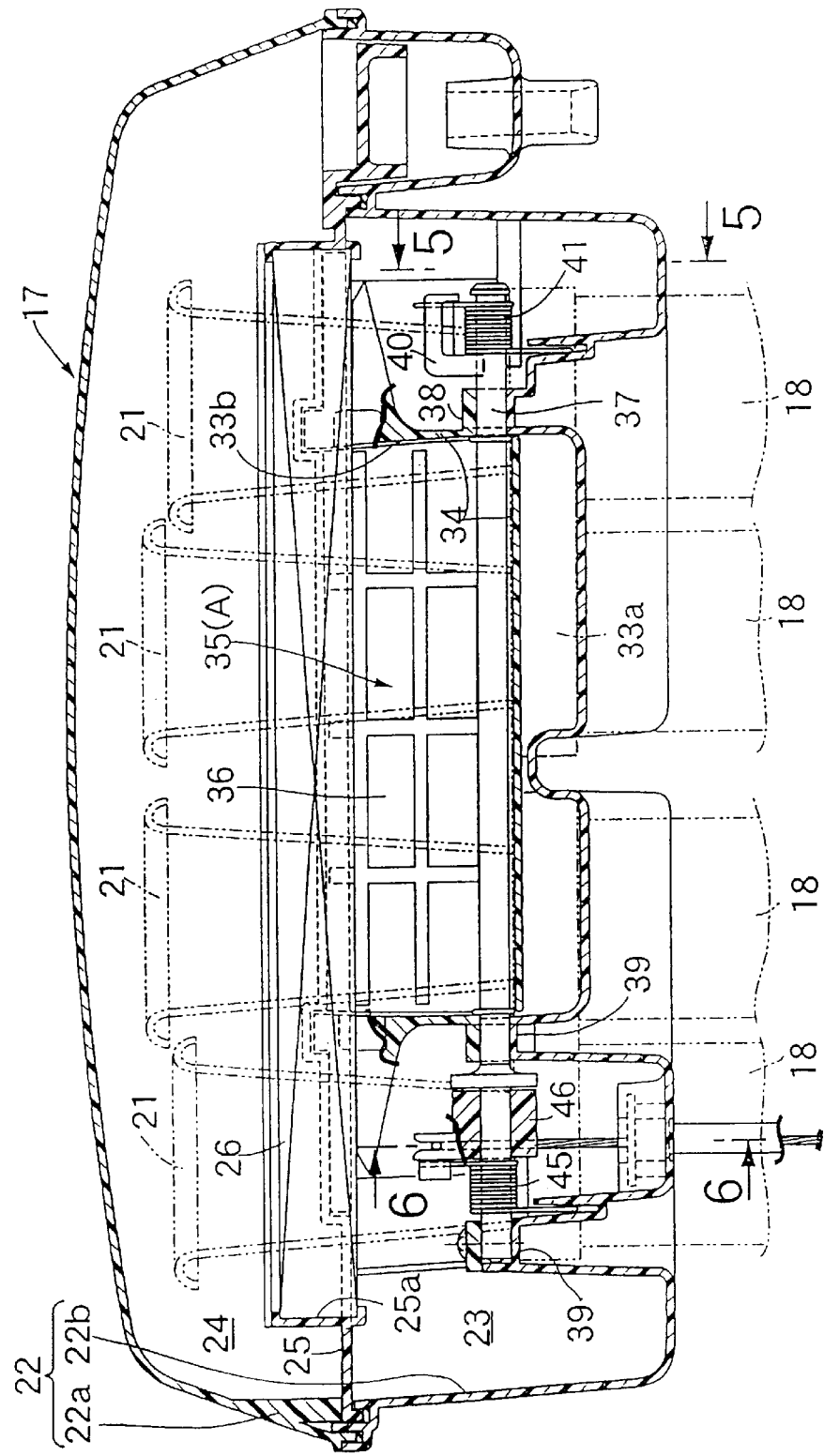
FIG. 4 is a sectional view taken along line 4—4 of FIG. 2 according to an embodiment of the present invention.
Figure 5:
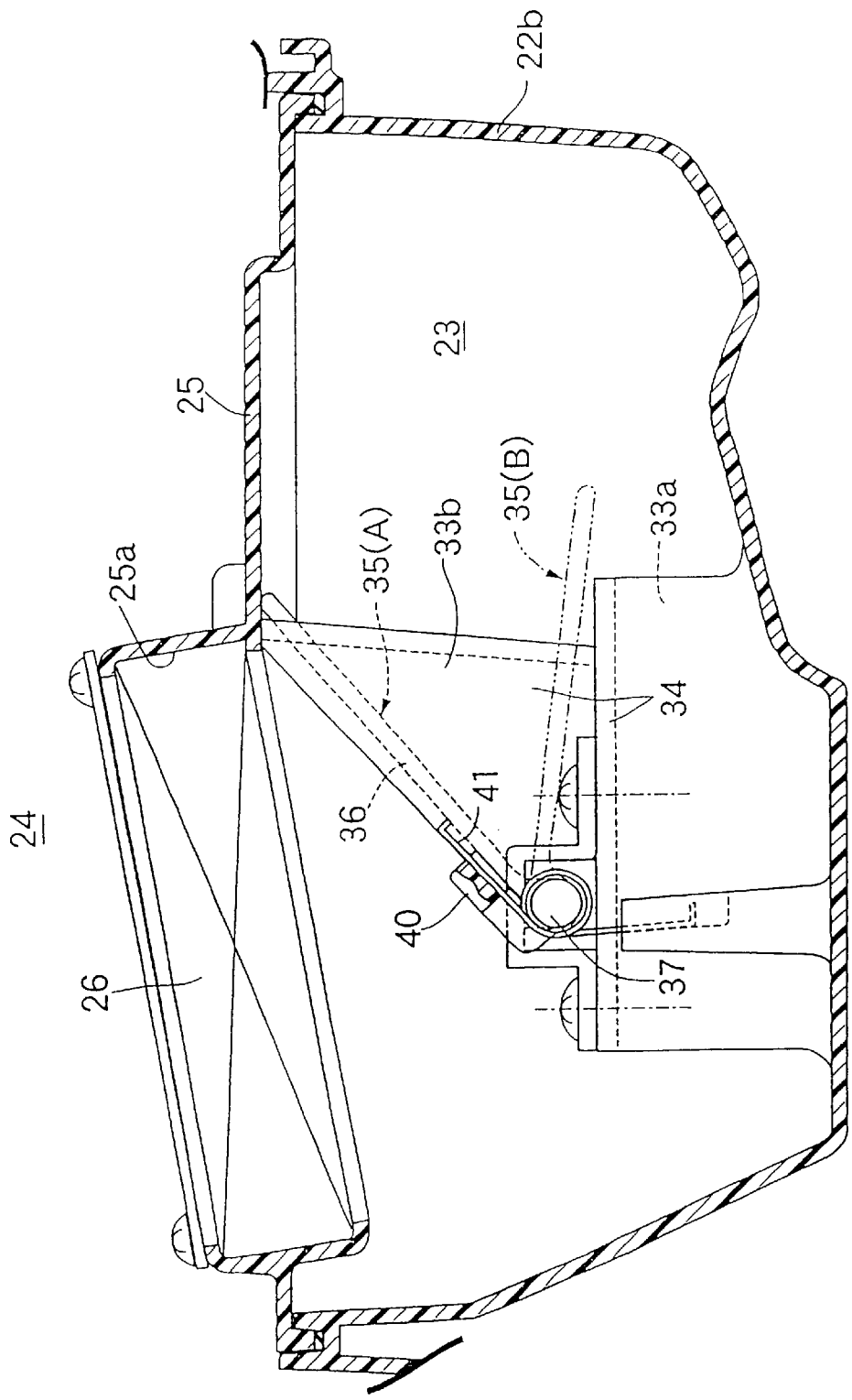
FIG. 5 is a sectional view taken along line 5—5 of FIG. 4 according to an embodiment of the present invention.
Figure 6:
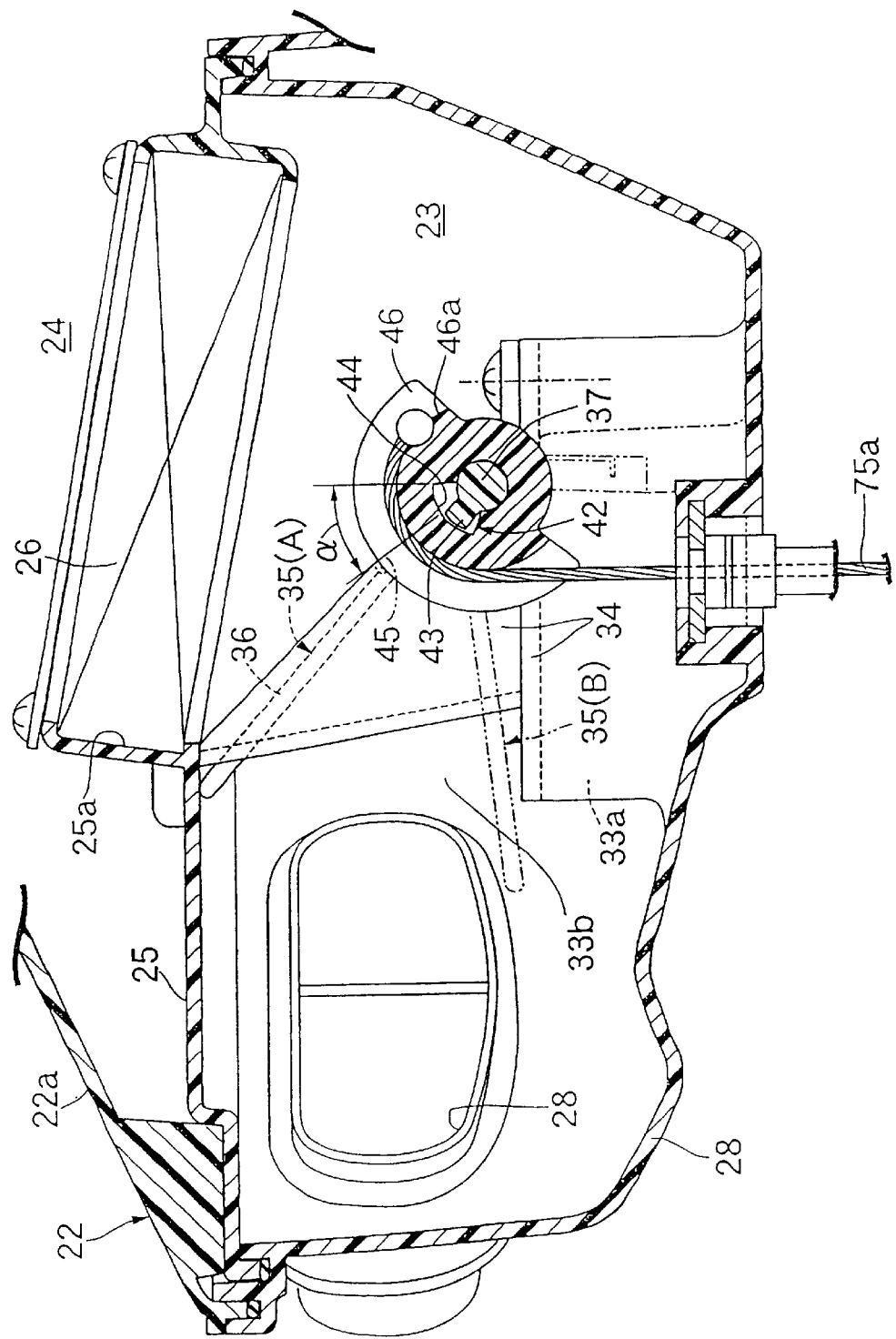
FIG. 6 is a sectional view taken along line 6—6 of FIG. 4 according to an embodiment of the present invention.
Figure 7:
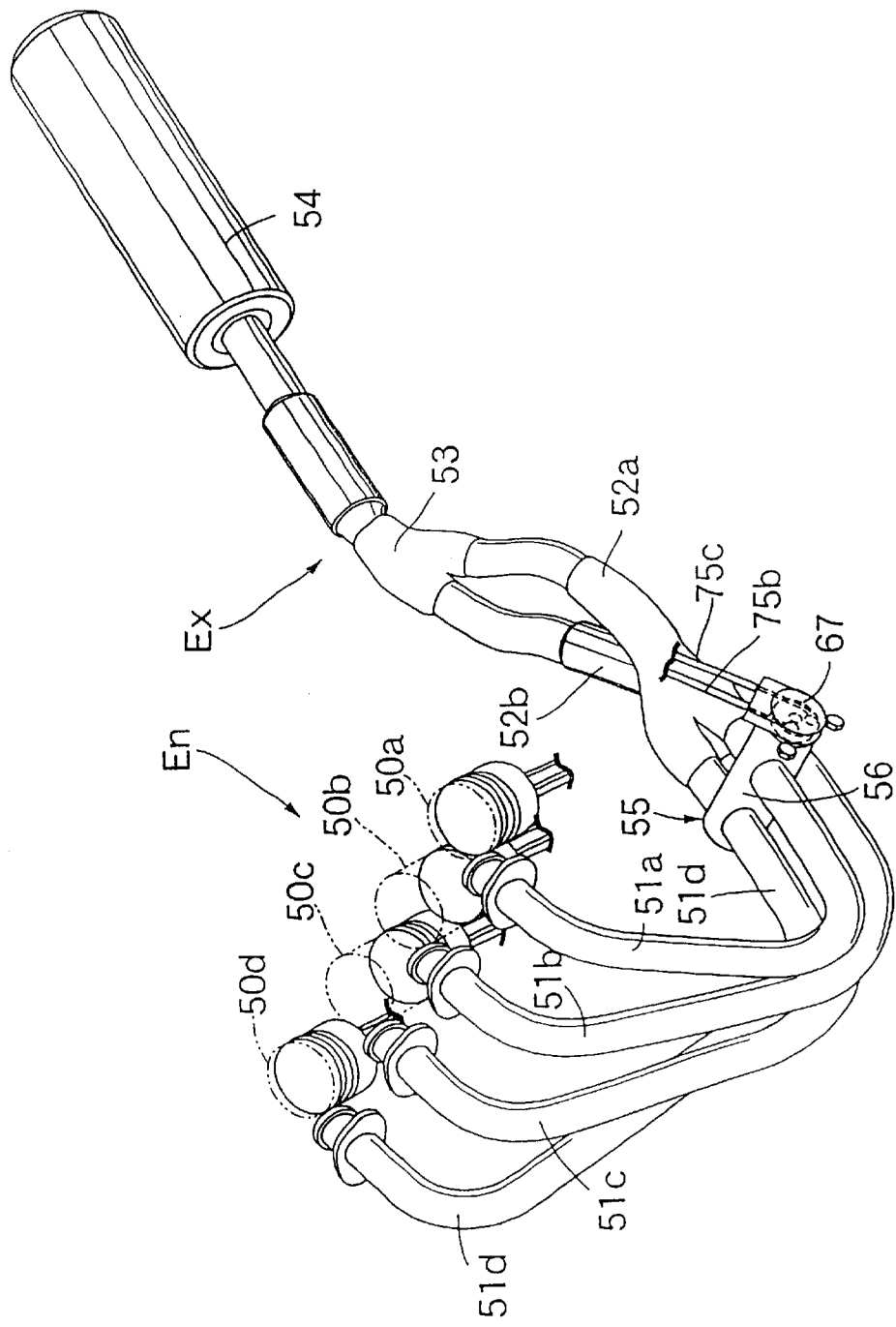
FIG. 7 is a perspective view of an exhaust system according to an embodiment of the present invention.

FIG. 1 is a side view of a motorcycle with an engine having an intake control device and an exhaust control device. FIG. 2 is a vertical sectional side view of a portion of an intake control device according to an embodiment of the present invention. FIG. 3 is a vertical sectional side view of a portion of an intake control device according to an embodiment of the present invention and corresponding to a different operational position than that of FIG. 2. FIG. 4 is a sectional view taken along line 4—4 of FIG. 2 according to an embodiment of the present invention. FIG. 5 is a sectional view taken along line 5—5 of FIG. 4 according to an embodiment of the present invention. FIG. 6 is a sectional view taken along line 6—6 of FIG. 4 according to an embodiment of the present invention. FIG. 7 is a perspective view of an exhaust system according to an embodiment of the present invention.

Figure 8:
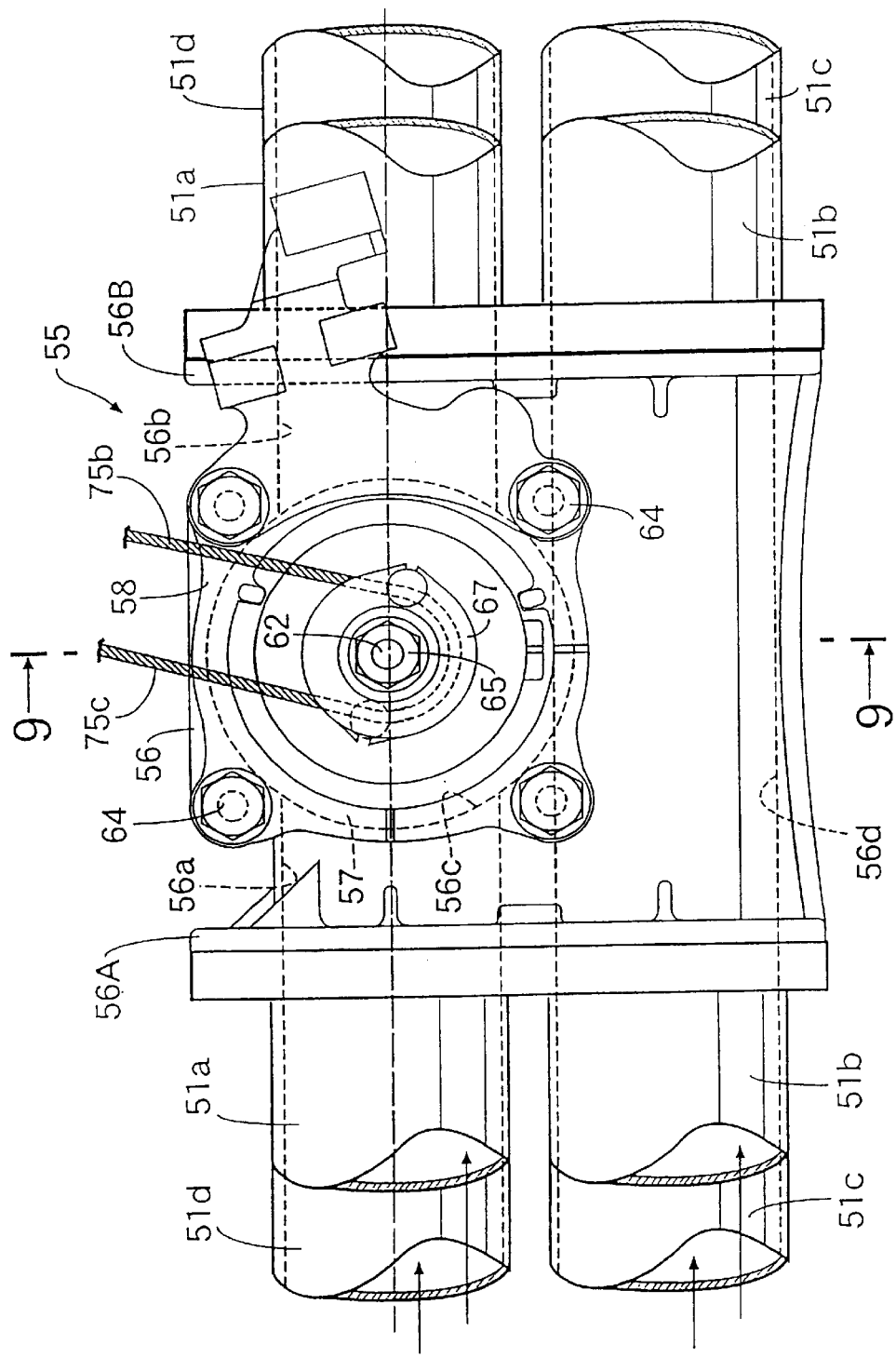
FIG. 8 is a side view of an exhaust control device according to an embodiment of the present invention.
Figure 9:
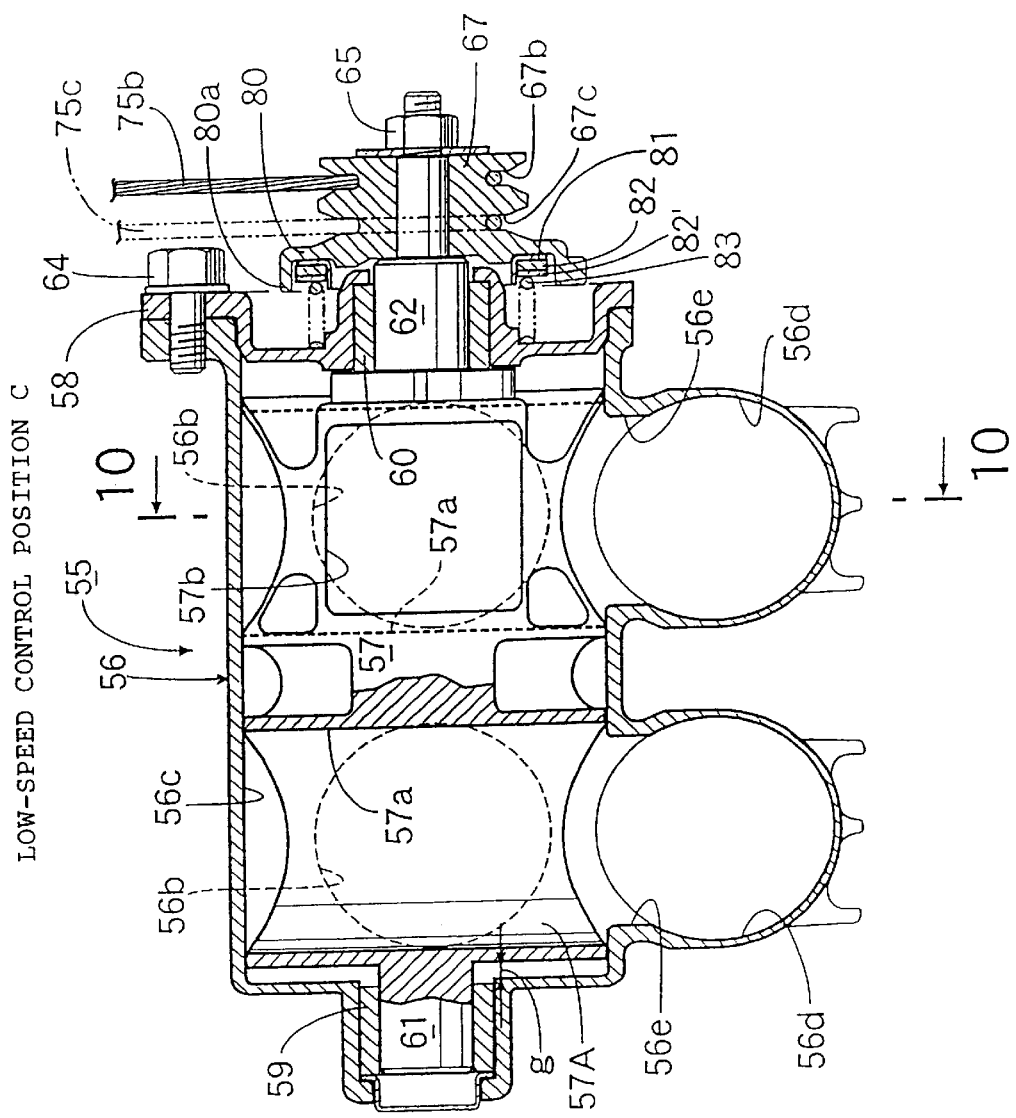
FIG. 9 is a sectional view taken along line 9—9 of FIG. 8 showing an exhaust control valve in its low-speed control position according to an embodiment of the present invention.
Figure 10:
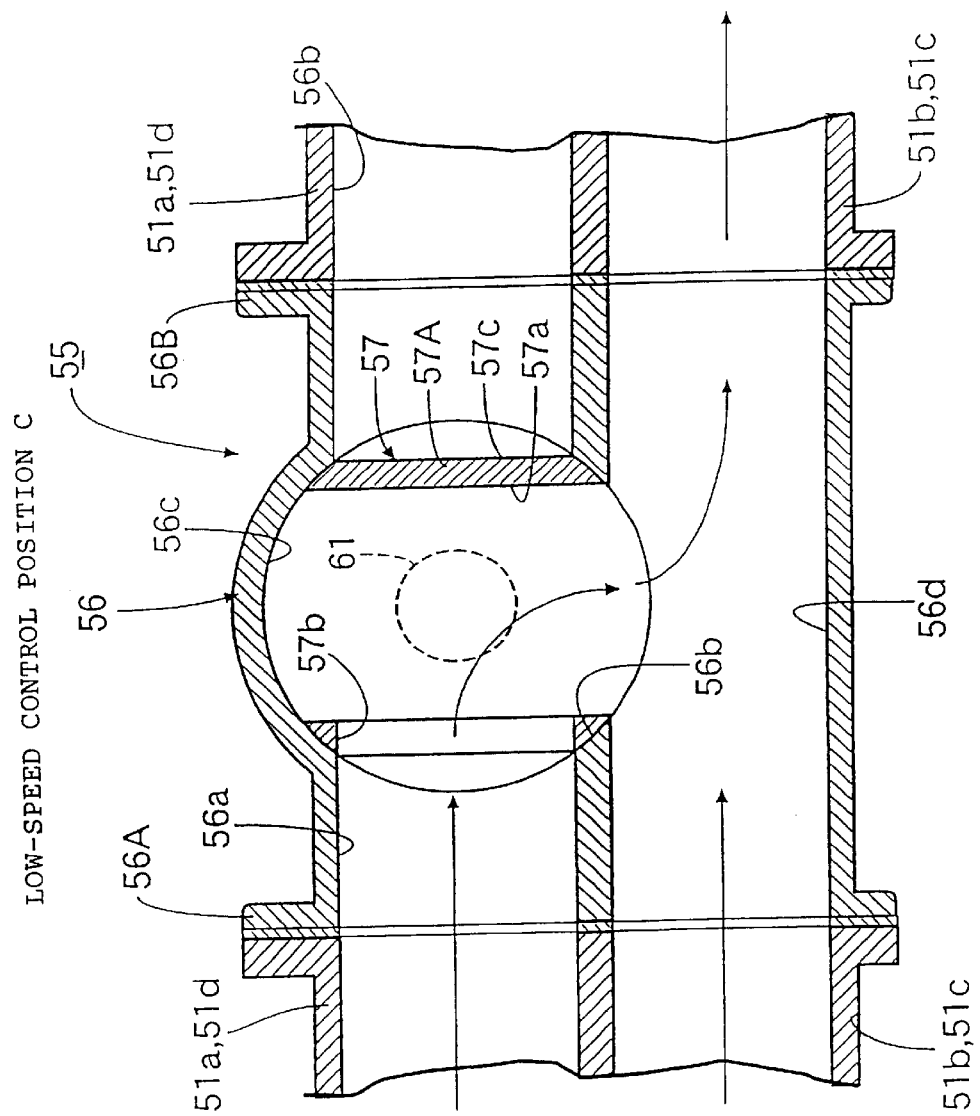
FIG. 10 is a sectional view taken along line 10—10 of FIG. 9 according to an embodiment of the present invention.
Figure 11:
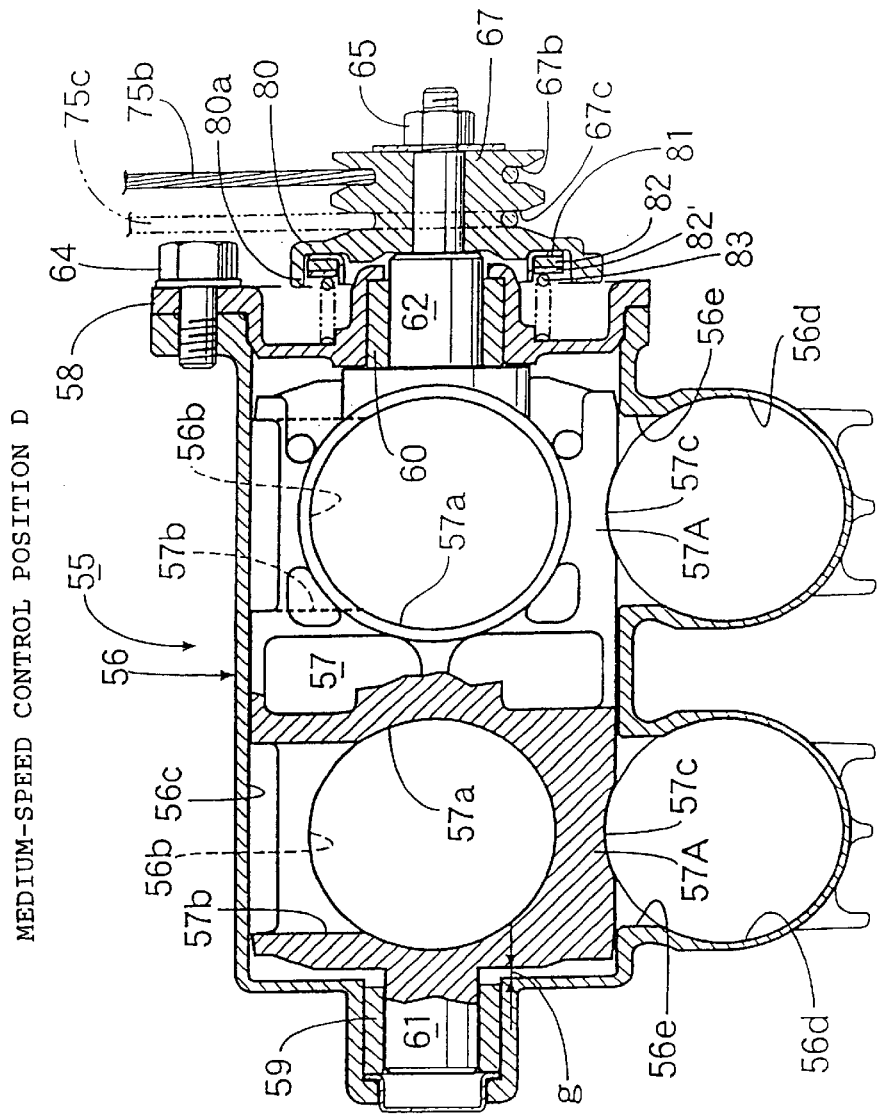
FIG. 11 is a sectional view taken along line 9—9 of FIG. 8 showing an exhaust control valve in its medium-speed control position according to an embodiment of the present invention.
Figure 12:
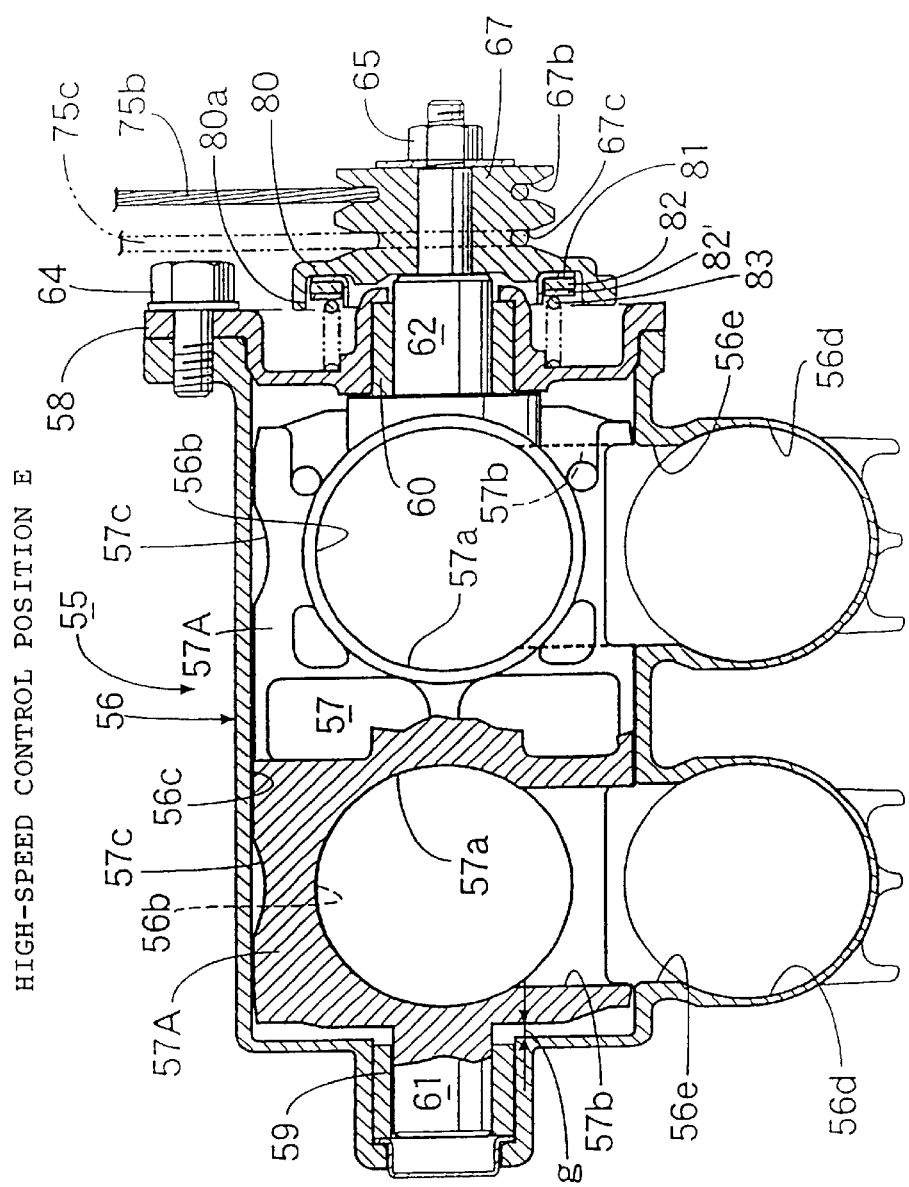
FIG. 12 is a sectional view taken along line 9—9 of FIG. 8 showing an exhaust control valve in its high-speed control position according to an embodiment of the present invention.

FIG. 8 is a side view of an exhaust control device according to an embodiment of the present invention. FIG. 9 is a sectional view taken along line 9—9 of FIG. 8 showing an exhaust control valve in its low-speed control position according to an embodiment of the present invention. FIG. 10 is a sectional view taken along line 10—10 of FIG. 9 according to an embodiment of the present invention. FIG. 11 is a sectional view taken along line 9—9 of FIG. 8 showing an exhaust control valve in its medium-speed control position according to an embodiment of the present invention. FIG. 12 is a sectional view taken along line 9—9 of FIG. 8 showing an exhaust control valve in its high-speed control position according to an embodiment of the present invention.

Figure 13:
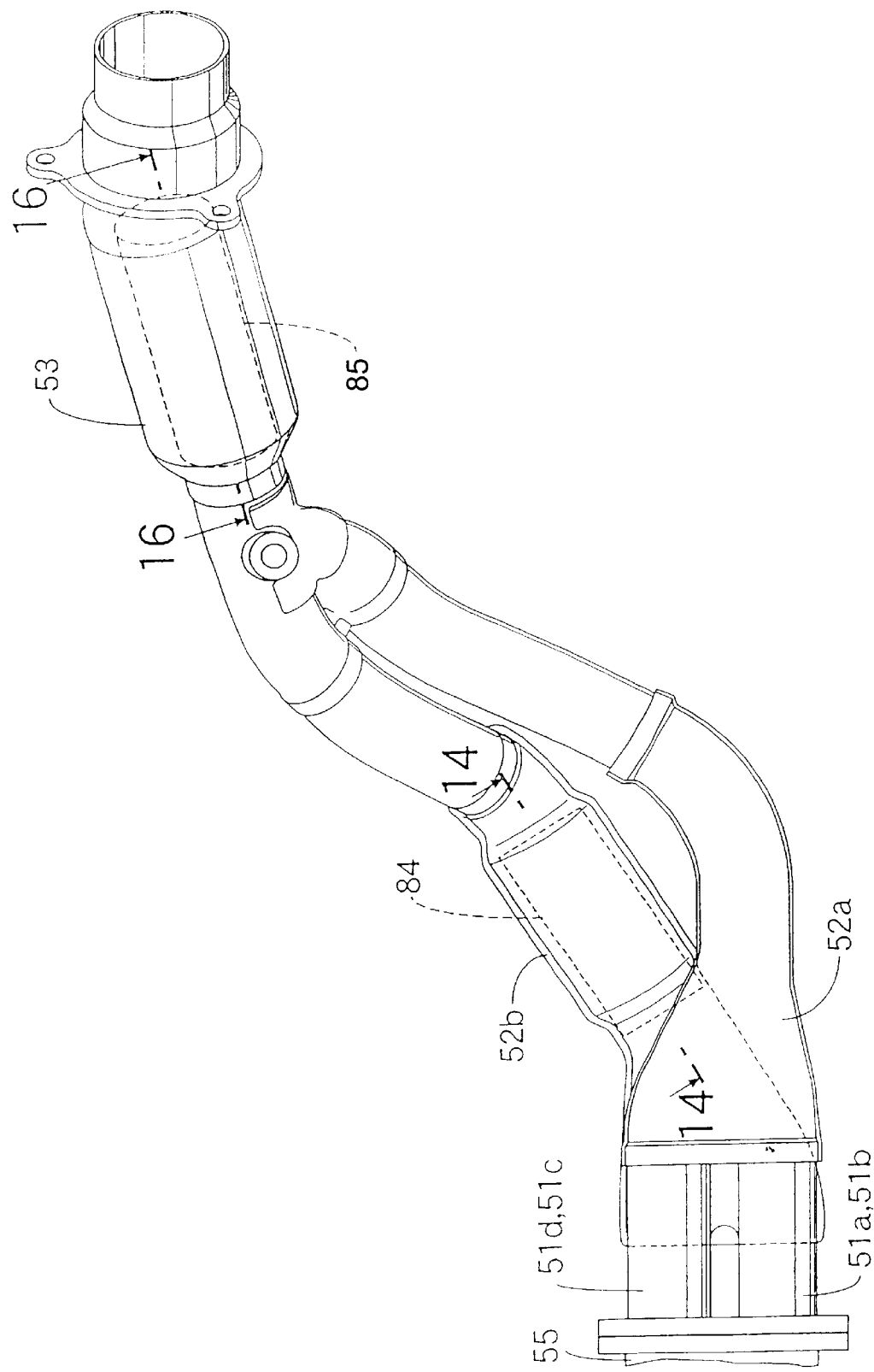
FIG. 13 is an enlarged plan view of a portion of the exhaust system according to an embodiment of the present invention.
Figure 14:
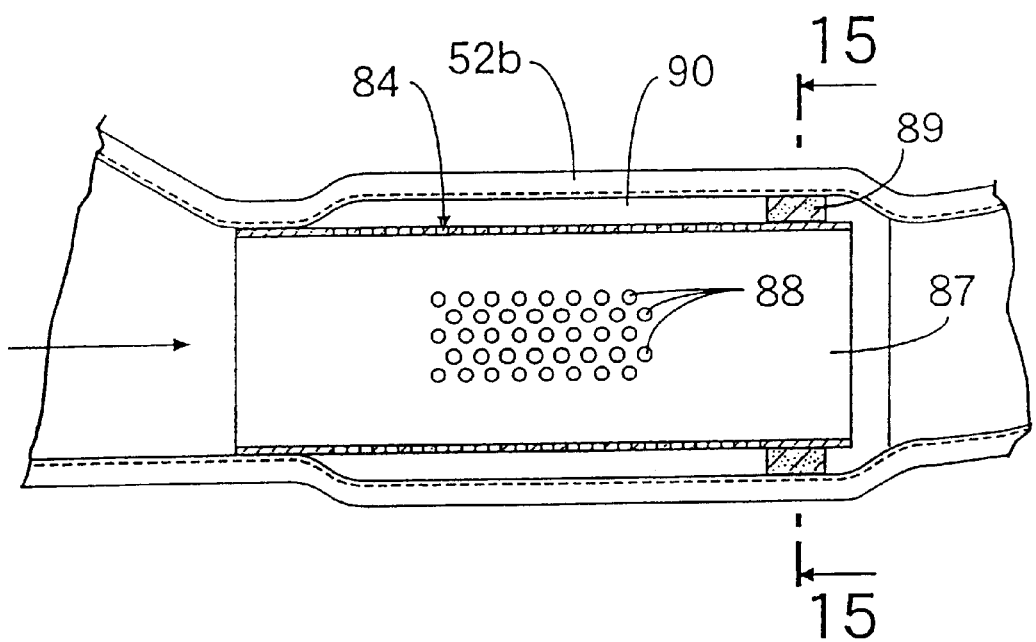
FIG. 14 is a sectional view taken along line 14—14 of FIG. 13 according to an embodiment of the present invention.
Figure 15:
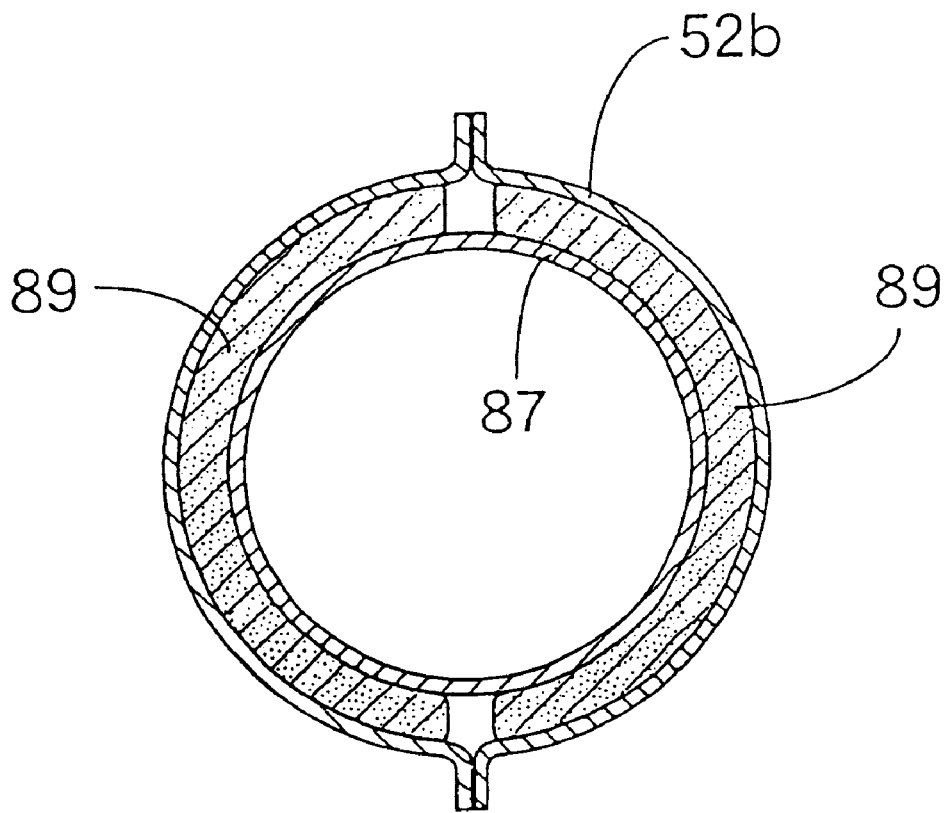
FIG. 15 is a sectional view taken along line 15—15 of FIG. 14 according to an embodiment of the present invention.
Figure 16:
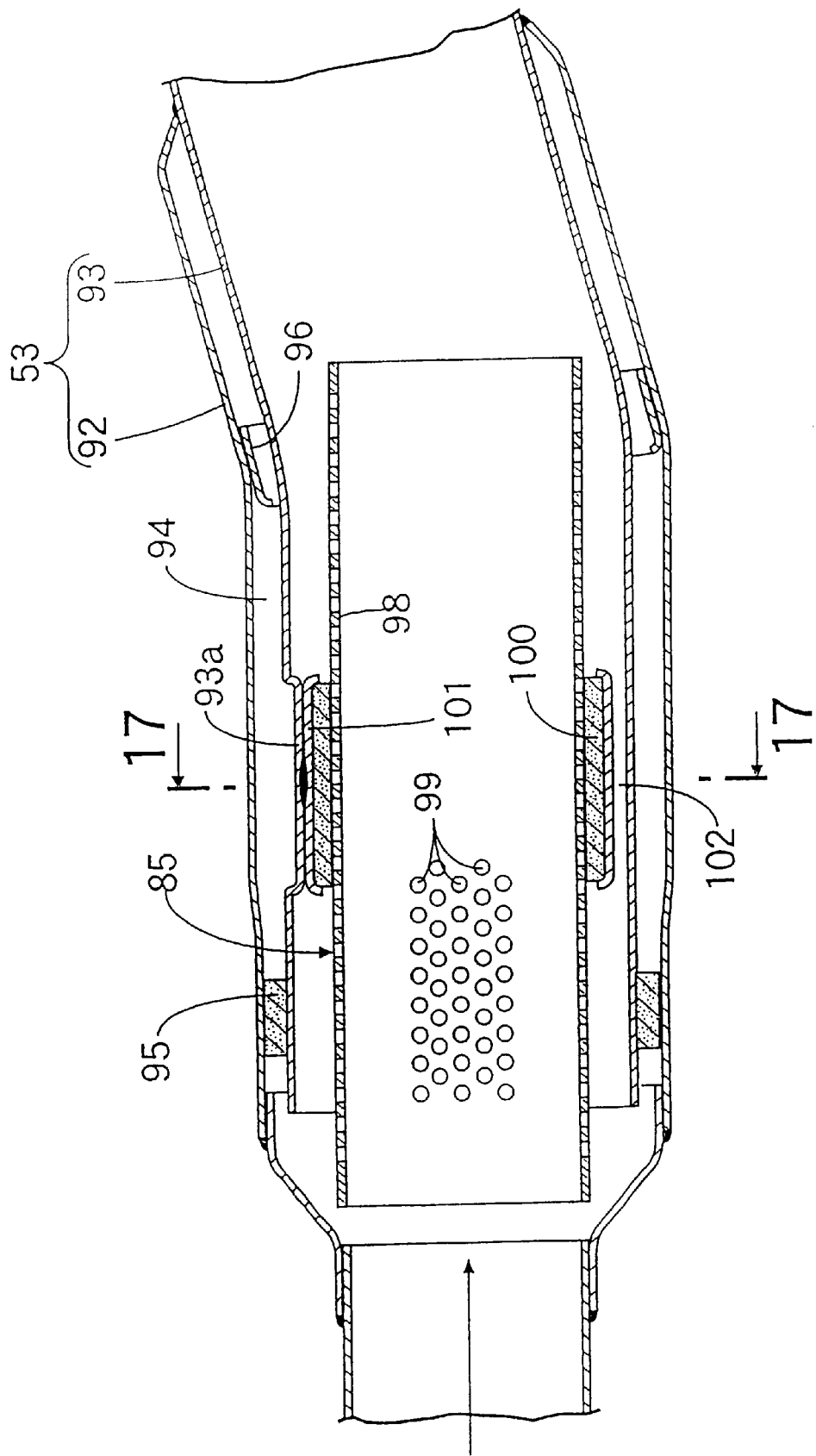
FIG. 16 is a sectional view taken along line 16—16 of FIG. 13 according to an embodiment of the present invention.
Figure 17:
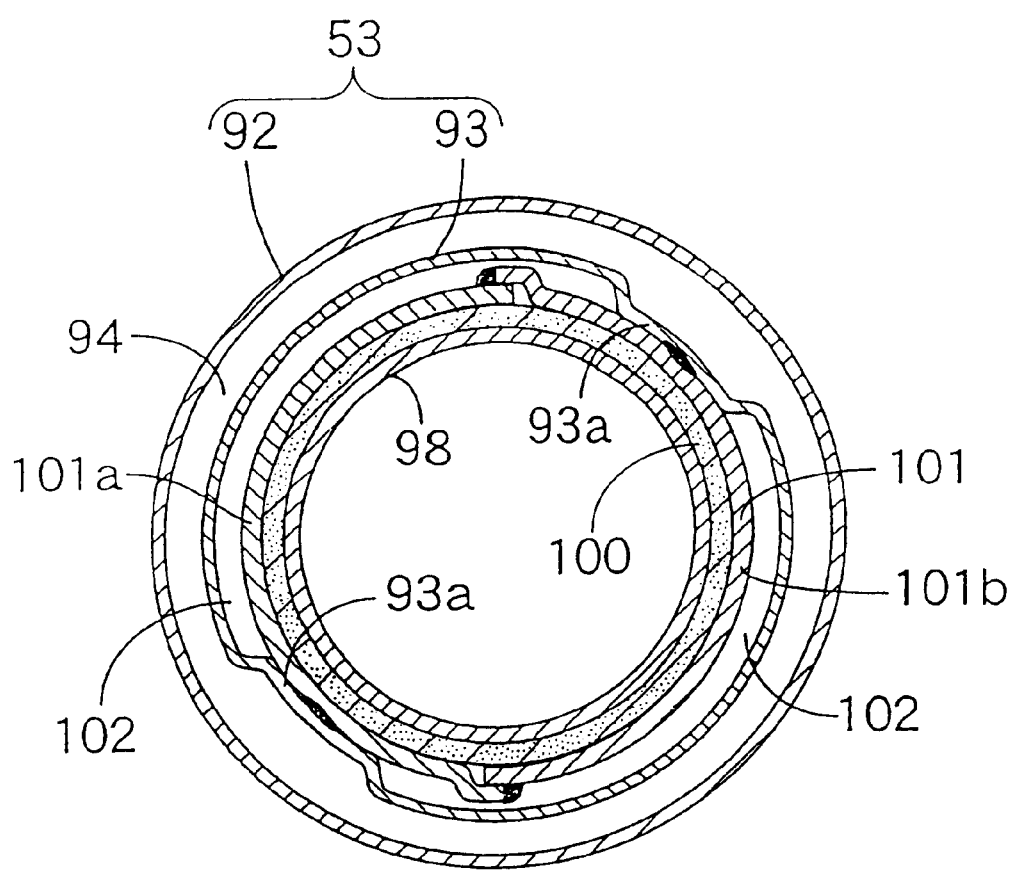
FIG. 17 is a sectional view taken along line 17—17 of FIG. 16 according to an embodiment of the present invention.
Figure 18:
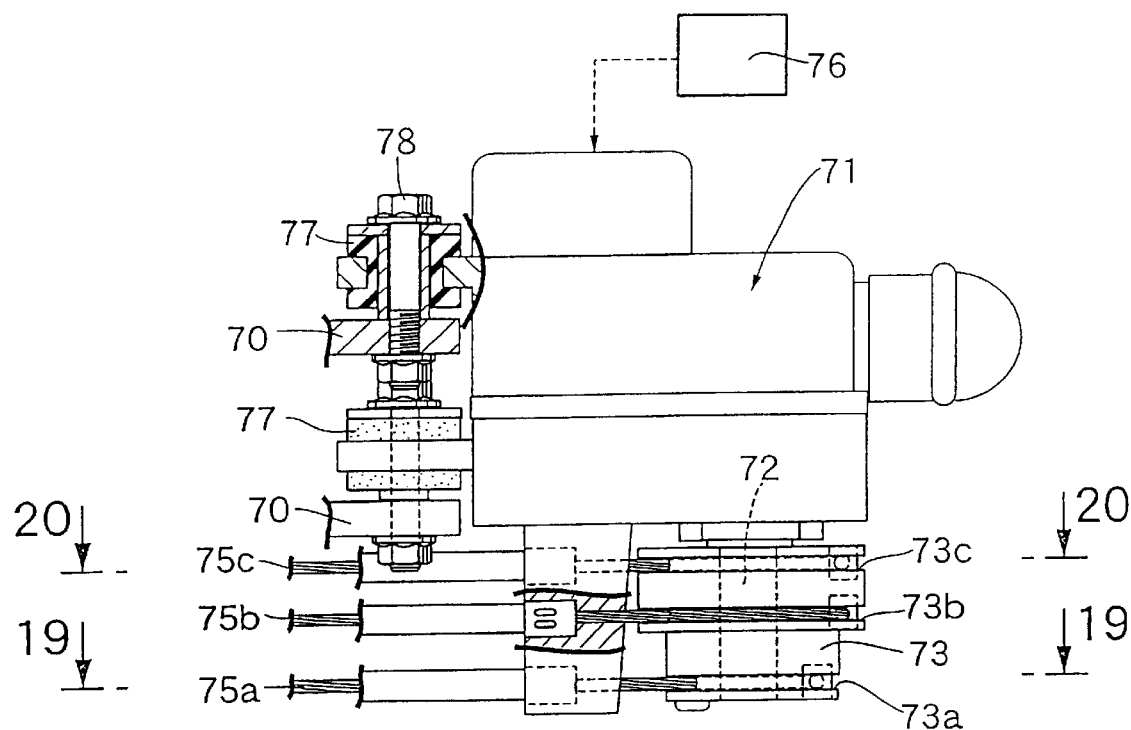
FIG. 18 is a plan view of a driving device for an intake control valve and an exhaust control valve according to an embodiment of the present invention.
Figure 19:
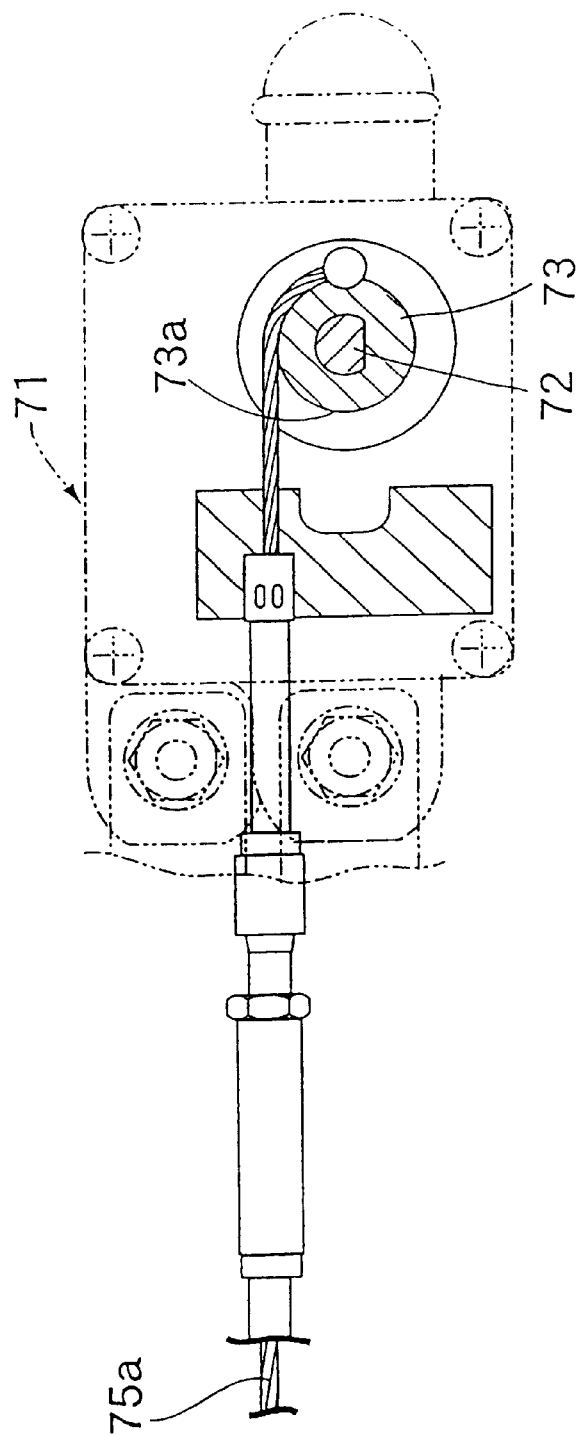
FIG. 19 is a sectional view taken along line 19—19 of FIG. 18 according to an embodiment of the present invention.
Figure 20:
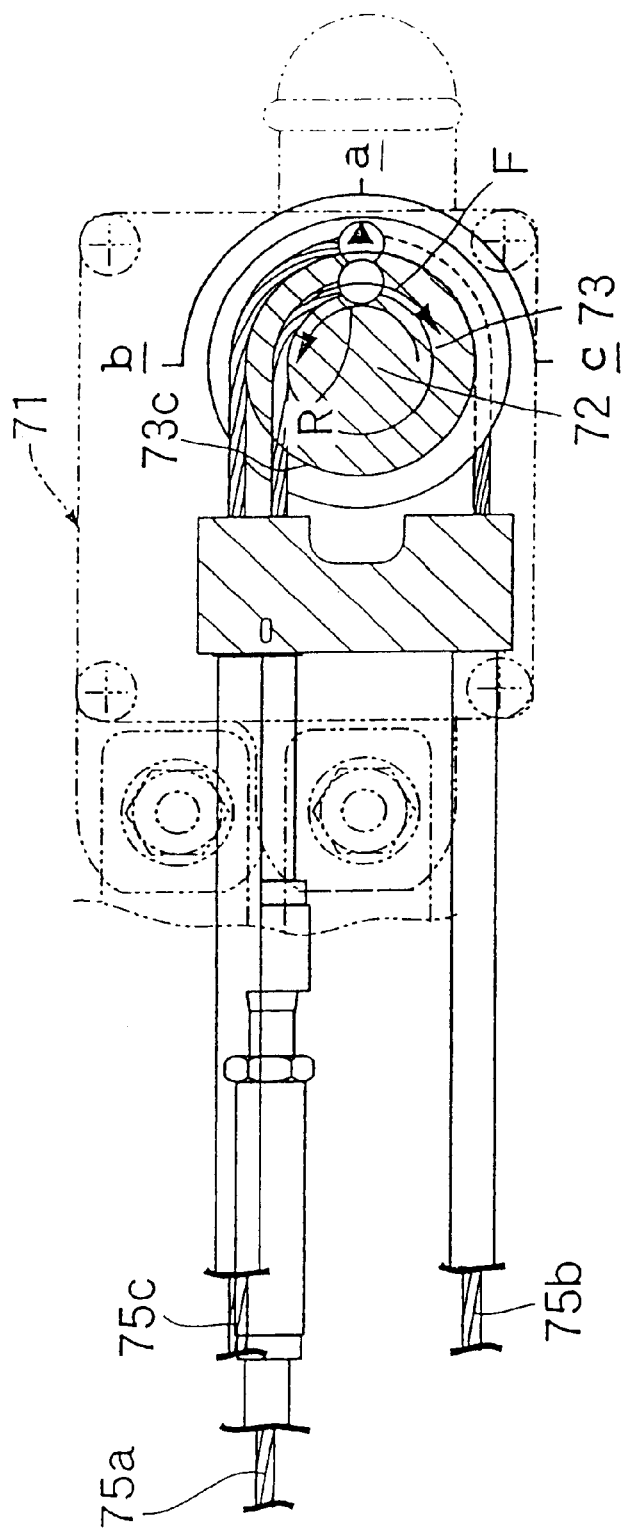
FIG. 20 is a sectional view taken along line 20—20 of FIG. 18 according to an embodiment of the present invention.

FIG. 13 is an enlarged plan view of a portion of the exhaust system according to an embodiment of the present invention. FIG. 14 is a sectional view taken along line 14—14 of FIG. 13 according to an embodiment of the present invention. FIG. 15 is a sectional view taken along line 15—15 of FIG. 14 according to an embodiment of the present invention. FIG. 16 is a sectional view taken along line 16—16 of FIG. 13 according to an embodiment of the present invention. FIG. 17 is a sectional view taken along line 17—17 of FIG. 16 according to an embodiment of the present invention. FIG. 18 is a plan view of a driving device for an intake control valve and an exhaust control valve according to an embodiment of the present invention. FIG. 19 is a sectional view taken along line 19—19 of FIG. 18 according to an embodiment of the present invention. FIG. 20 is a sectional view taken along line 20—20 of FIG. 18 according to an embodiment of the present invention.

In FIG. 1, a vehicle body frame 2 of a motorcycle 1 includes left and right pairs of main frames 4, 4 having a head pipe 3 at their front ends. The left and right pairs of main frames 4, 4 slope downward and rearward, and have their rear ends coupled to each other. A seat rail 5 is connected to the rear ends of the main frames 4, 4 and sloping up rearwards, and a parallel four-cylinder engine En is mounted on the pair of main frames 4, 4.

The engine En is mounted within the frame 2 by sloping a cylinder block 8 and a cylinder head 9a slightly forward with respect to a vehicle longitudinal centerline and inserting the cylinder head 9 between the main frames 4, 4.

A front fork 6f for supporting a front wheel 7f through a shaft is steerably connected to the head pipe 3. A rear fork 6r supporting a rear wheel 7r is vertically connected to a rear portion of a crankcase 10 of the engine En through a pivotal shaft 11. A rear cushion unit 12 is inserted between the rear fork 6r and the main frames 4, 4 thereby permitting oscillatory movement. An output shaft 13 of the engine En mounted on a front side of the pivotal shaft 11 drives the rear wheel 7*r* through a chain transmission device 14.

A fuel tank 15 is mounted on the main frames 4, 4, and a tandem main seat 16 is fitted to the seat rail 5.

An intake system In of the engine En includes an air cleaner 17 and a throttle body 18 disposed on an upper side of the cylinder head 9 in such a fashion as to be covered with the fuel tank 15. An exhaust system Ex of the engine En includes exhaust pipes 51*a* to 51*d* and an exhaust muffler 54 disposed so as to extend from a front side of the cylinder head 9 and the cylinder block 8 through the lower side of the crankcase 10 and slanting in an upward direction.

The intake system In of the engine En according to an embodiment of the present invention will now be described with reference to FIG. 1 to FIG. 6.

As shown in FIG. 1 to FIG. 4, four throttle bodies 18, 18 each corresponding to each of four cylinders are connected to the cylinder head 9 of the engine En. Air funnels 21, 21 are connected to an inlet of an intake path 18*a* of the throttle bodies 18, 18. A cleaner case 22 of the air cleaner 17 for containing all the air funnels 21, 21 is fitted to the four throttle bodies 18, 18.

The cleaner case 22 includes a lower case half 22*b* attached to the throttle bodies 18, 18 and an upper case half 22*a* separately and removably joined to the lower case half 22*b* by small screws 27. An element fitting plate 25 for partitioning the interior of the cleaner case 22 into a lower dirty air chamber 23 and an upper clean chamber 24 is sandwiched between the case halves 22*a* and 22*b*. A cleaner element 26 is fitted within a fitting hole 25*a* provided in the element fitting plate 25.

An air intake port 28 for opening the dirty air chamber 23 to the atmosphere is provided on one side of the lower case half 22*b*. The air funnels 21, 21 are arranged to penetrate a bottom wall of the lower case half 22*b* and their respective inlets open into the clean chamber 24.

Therefore, during operation of the engine En, air flowing through the air intake port 28 into the dirty air chamber 23 is filtered by the cleaner element 26 before passing into the cleaning air chamber 24. Inlet air then flows into the air funnels 21 and throttle bodies 18, and is taken into the engine En at a flow rate controlled by throttle valves 29 positioned within the throttle bodies 18.

In this process, a fuel is injected toward an intake port of the engine En from a fuel injection valve 32 fitted at a side wall of each of the throttle bodies 18.

The throttle valves 29 of all the throttle bodies 18 have valve shafts 29*a* connected with each other for conjunctive operation. The throttle valves are opened and closed by a throttle grip fitted to a steering handle of the motorcycle 1 through a pulley 30 attached to the valve shaft 29*a* on its exterior and an operating wire 31 connected to the pulley 30.

The lower case half 22*b* is provided integrally with a partition wall 34 for partitioning an intermediate portion of the dirty air chamber 23 into a lower small-section passage 33*a* and an upper large-section passage 33*b*. An intake control valve 35 for opening and closing the large-section passage 33*b* is supported by the partition wall 34 through a shaft.

The intake control valve 35 includes a valve plate 36 and a valve shaft 37 formed integrally with a side end of the valve plate 36. The partition wall 34 is provided with one bearing 38 for rotatably supporting one end portion of the valve shaft 37 and a left-right pair of bearings 39, 39 for rotatably supporting the other end portion of the valve shaft 37.

As shown in FIG. 3, the intake control valve 35 is turned between a first intake control position A (See FIG. 2) where the tip end of the valve plate 36 is put into contact with a ceiling surface of the large-section passage 33*b* to fully close the large-section passage 33*b*, and a second intake control position B where the valve plate 36 is put in parallel with the partition wall 34 to fully open the passage 33*b*.

In the case illustrated, the angle of turning is about 45 degrees. In the second intake control position B of the intake control valve 35, the valve plate 36 is in a slanted position with its tip end directed to the upstream side of the large-section passage 33*b*, and the valve plate 36 is urged toward a closing direction by the intake negative pressure of the engine En.

A return spring 41 is connected to an arm 40 for urging the valve plate 36 in a closing direction, specifically, toward the first intake control position A through the arm 40. The arm 40 is formed integrally with a first end portion of the valve shaft 37. A driven pulley 46 connected through a first transmission wire 75*a* to a driving pulley 73 of an actuator 71 (described later) between the pair of bearings 39, 39 is fitted to a second end portion of the valve shaft 37.

A lost motion mechanism 42 for coupling the driven pulley 46 and the valve shaft 37 is provided between the driven pulley 46 and the valve shaft 37. The lost motion mechanism 42 includes a transmission pin 43 projecting from a side surface of the valve shaft 37, an arc groove 44 formed in an internal circumferential surface of the driven pulley 46 and extending in the circumferential direction for engaging the transmission pin 43, and a lost motion spring 45 urging the driven pulley 46 toward the first intake control position A of the intake control valve 35.

A center angle of the arc groove 44 is set larger than the angle of opening and closing of the intake control valve 35 so that, when the driven pulley 46 is rotated from a retracted position in the opening direction of the intake control valve 35, namely, toward the second intake control position B, an end surface of the arc groove 44 comes into contact with the transmission pin 43. This action starts moving the intake control valve 35 toward the second intake control position B after a predetermined play angle α is passed.

Next, the exhaust system Ex of the engine En will be described in detail with reference to FIG. 1 and FIG. 7 through FIG. 17.

First, in FIG. 1 and FIG. 7, four parallel cylinders of the engine En will be called No. 1 to No. 4 cylinders 50*a* to 50*d*, respectively, as seen from the left side of the vehicle. An ignition sequence for each of the cylinders is carried out according to the sequence of No. 1 cylinder 50*a*, No. 2 cylinder 50*b*, No. 4 cylinder 50*d* and No. 3 cylinder 50*c*.

No. 1 to No. 4 exhaust pipes 51*a* to 51*d* corresponding respectively to the No. 1 to No. 4 cylinders 50*a* to 50*d* are connected to a front surface of the cylinder head 9. The exhaust pipes 51*a* to 51*d* extend downward from a front surface of the engine En and then bend rearwards at a lower location.

Below the engine En, the No. 1 and No. 4 exhaust pipes 51*a* and 51*d* are adjacently disposed on the left and right sides, and the No. 2 and No. 3 exhaust pipes 51*b* and 51*c* are adjacently disposed beneath the No. 1 and No. 4 exhaust pipes, respectively. An exhaust control valve 55 is provided at an intermediate portion of the exhaust pipes 51*a* to 51*d*.

As shown in FIG. 8 to FIG. 12, the exhaust control valve 55 includes a common valve housing 56 interposed in an intermediate portion of the No. 1 to No. 4 exhaust pipes 51*a* to 51*d*, and a valve body 57 mounted in the valve housing 56. The upstream side and the downstream side of the No. 1 to No. 4 exhaust pipes 51a to 51d are connected respectively to front and rear flanges 56A, 56B provided at front and rear ends of the valve housing 56.

The valve housing 56 is provided with pairs of inlet ports 56a, 56a and outlet ports 56b, 56b opening to each end face of the front and rear flanges 56A, 56B and coinciding with the upstream-side and downstream-side pipes of the No. 1 and No. 4 exhaust pipes 51a, 51d. A cylindrical valve chamber 56c is provided between the inlet ports 56a, 56a and the outlet ports 56b, 56b and extending in a direction orthogonal to the axis line of each port.

A pair of communication ports 56d, 56d formed between the front and rear flanges 56A, 56B and coinciding with the upstream-side and downstream-side pipes of the No. 2 and No. 3 exhaust pipes 51b, 51c is also provided in the valve housing 56. A pair of communication holes 56e, 56e for communicating the communication ports 56d, 56d to the valve chamber 56c are provided on the upper side of the communication ports 56d, 56d.

One end of the valve chamber 56c is closed by an end wall integral with the valve housing 56, and a bearing bushing 59 is mounted on the end wall. The other end of the valve chamber 56c is open, and a bearing bracket 58 for closing the other end is fixed to the valve housing 56 by bolts 64. The bearing bracket 58 has a bearing bushing 60 arranged coaxial with the bearing bush 59.

On the other hand, the valve body 57 is rotatably mounted in the valve chamber 56c and is generally cylindrical in shape. At both ends in the axial direction, the valve body 57 is provided integrally with valve shafts 61, 62 that are coaxial with the valve body 57. The valve body 57 having its valve shafts 61, 62 rotatably supported by the bearing bushes 59, 60, is rotated between a low-speed control position C, a medium-speed control position D and a high-speed control position E.

In this case particularly, the bearing bush 60 in the bearing bracket 58 protrudes a little from an internal end face of the bearing bracket 58 so as to support an end face of the valve body 57 also.

In a preferred embodiment, the valve housing 56 is cast from a titanium material, and the valve body 57 also is cast from a titanium material together with the valve shafts 61, 62. On the other hand, the bearing bushes 59, 60 for supporting the valve shafts 61, 62 are formed from a nonmetallic material having excellent bearing properties and excellent sealing properties as well. For example, a carbon material such as carbon graphite is utilized in a preferred embodiment.

A driven pulley 67 is attached by a nut 65 to a tip end portion of the valve shaft 62 protruding to the outside of the bearing bracket 58. The driven pulley 67 is driven by a driving pulley 73 of the actuator 71 (described later), through second and third transmission wires 75b, 75c.

The driven pulley 67 is provided integrally with a flange portion 80 having an annular retaining recess portion 80a opening to the side of the bearing bracket 58. An annular retainer 81 and two thrust washers 82, 82' are retained rotatably relative to the retainer 81 in the retaining recess portion 80a. A thrust spring 83 is compressed and disposed between the thrust washers 82, 82' in a compressed/stored energy position.

The bearing bracket 58 having a certain load from the thrust spring 83 ensures that an end face of the valve body 57 and an end face of the bearing bush 60 are maintained in a pressure contact seal condition. A gap g is formed between opposed end faces of an end wall of the valve housing 56 on the opposite side of the bearing bracket 58 and the valve body 57. Thermal expansion of the valve body 57 in the axial direction is thereby absorbed by the gap g.

The valve body 57 is provided with a pair of through-holes 57a capable of coinciding with the inlet port 56a and the outlet port 56b crossing the axis line of the valve body 57. Communication holes 57b for opening one side face of the through-holes 57a in a radial direction of the valve body 57 are also provided therein.

In a low-speed control position C of the valve body 57 (See FIG. 9 and FIG. 10), the communication hole 57b overlaps with the inlet port 56a of the valve housing 56, while one end side of the through-hole 57a overlaps with the communication hole 56e of the valve housing 56. A valve wall 57A of the valve body 57 opposed to the communication hole 57b closes up the outlet port 56b.

In a medium-speed control position D (See FIG. 11), the through-holes 57a coincide with the inlet and outlet ports 56a, 56b, and the valve wall 57A closes the communication hole 56e. An outer surface of the valve wall 57A is provided with an arc-shaped recess portion 57c connected to an internal circumferential surface of the communication port 56d in the medium-speed control position D (See FIG. 12).

In the high-speed control position E, the through-holes 57a coincide with the inlet and outlet ports 56a, 56b, and the communication hole 57b coincides with the communication hole 56e. Therefore, the medium-speed control position D and the high-speed control position E of the valve body 57 are spaced from each other by about 180 degrees, and the low-speed control position C occurs at a middle point between the control positions D and E.

In FIG. 1, FIG. 7 and FIG. 13, where the No. 1 to No. 4 exhaust pipes 51a to 51d have passed by the exhaust control valve 55, the No. 1 and No. 4 exhaust pipes 51a, 51d are connected to an upper first exhaust collecting pipe 52a for collecting exhaust gases from these pipes. Similarly, the No. 2 and No. 3 exhaust pipes 51b, 51c are connected to a lower first exhaust collecting pipe 52b for collecting exhaust gases therefrom.

Thereafter, the exhaust collecting pipes 52a, 52b are connected to a second exhaust collecting pipe 53 for collecting exhaust gases therefrom, and an exhaust muffler 54 is connected to the rear end of the second exhaust collecting pipe 53. The upper and lower first exhaust collecting pipes 52a, 52b each are provided with exhaust cleaners. The lower first exhaust collecting pipe 52b in communication with the communication port 56d of the exhaust control valve 55 is provided therein with a primary exhaust cleaner 84. The second exhaust collecting pipe 53 is provided therein with a secondary exhaust cleaner 85.

As shown in FIG. 14 and FIG. 15, the primary exhaust cleaner 84 is not limited in its type. In the embodiment shown, the cleaner 84 includes a ternary catalyst converter having a cylindrical catalyst carrier 87 having innumerable through-pores 88 in its peripheral wall. One end portion of the catalyst carrier 87 is fixed by welding to the inner wall of the lower first exhaust collecting pipe 52b. The other end portion is slidably retained on the inner wall through a heat insulating member 89 made from glass wool, steel wool or the like. A cylindrical adiabatic space 90 is formed between the rest intermediate portion of the catalyst carrier 87 and the lower first exhaust collecting pipe 52b.

Therefore, thermal elongation of the primary exhaust cleaner 84 is allowed by slippage between the primary exhaust cleaner 84 and the heat insulating member 89. It is possible to suppress generation of thermal strain in the primary exhaust cleaner 84 and the lower first exhaust collecting pipe 52b. With the heat insulating member 89 and the adiabatic space 90, it is possible to sustain the temperature of the primary exhaust cleaner 84 and to prevent overheating of the lower first exhaust collecting pipe 52b.

As shown in FIG. 16 and FIG. 17, the second exhaust collecting pipe 53 includes an outer pipe 92 connected to an upstream side and an inner pipe 93 connected to the downstream side. The inner pipe 93 is disposed in the inside of the outer pipe 92 with a cylindrical adiabatic space 94 therebetween.

The downstream end of the outer pipe 92 is welded to the outer circumference of the inner pipe 93, and the upstream end of the inner pipe 93 is relatively slidably supported by the outer pipe 92 via a heat insulating member 95 composed of glass wool, steel wool or the like. The second exhaust collecting pipe 53 is slightly bent at its intermediate portion, and a guide ring 96 surrounding the inner pipe 93 is welded to the inner circumferential surface of the outer pipe 92 at the bend portion.

The secondary exhaust cleaner 85 also is not limited to the embodiment shown in the accompanying figures. The preferred embodiment shows a secondary exhaust cleaner 85 having a ternary catalyst converter with a cylindrical catalyst carrier 98 having innumerable through-pores 99 in its circumferential wall. The catalyst carrier 98 is fitted to the inner pipe 93 through a heat insulating member 100 and a retaining ring 101 at a central portion in the axial direction.

The heat insulating member 100 is made of glass wool, steel wool or the like. The retaining ring 101 is formed by overlap welding of opposed end portions of a pair of half-rings 101a, 101b. In this case, a compression force is applied to the heat insulating member 100, whereby a frictional force for slidably retaining the catalyst carrier 98 is produced between the heat insulating member 100 and the catalyst carrier 98.

The inner pipe 93 is provided with a pair of protuberances 93a projecting radially inward and opposed to each other diametrically. The outer circumferential surface of the retaining ring 101 is welded to the protuberances 93a. An adiabatic space 102 is formed at the rest portion other than the welded portions between the retaining ring 101 and the inner pipe 93.

Portions of the catalyst carrier 98 other than the central portion retained by the retaining ring 101 are sufficiently parted away from the inner circumferential surface of the inner pipe 93, so that exhaust gas can be freely circulated in the interior and exterior of the catalyst carrier 98 through the innumerable through-pores 99.

Therefore, a central portion of the secondary exhaust cleaner is slidably supported on the inner pipe 93 through the heat insulating member 100 and the retaining ring 101. Thermal elongation of the secondary exhaust cleaner 85 is allowed by slippage between the secondary exhaust cleaner 85 and the heat insulating member 100. Accordingly, it is possible to suppress generation of thermal strain in the secondary exhaust cleaner 85 and the inner pipe 93.

With this arrangement of the heat insulating member 100, the adiabatic space 102, the inner pipe 93 and the outside adiabatic space 94, it is possible to effectively sustain the temperature of the secondary exhaust cleaner 85 and to prevent overheating of the outer pipe 92. In addition, the secondary exhaust cleaner 85 is supported in one stable position. At portions other than the supported portion, exhaust gas can be circulated in the inside and outside of the catalyst carrier 98 through the through-pores 88, so that cleaning of the exhaust gas can be achieved effectively.

Further, any difference between thermal elongations of the outer pipe 92 and the inner pipe 93 constituting the second exhaust collecting pipe 53 is permitted by slippages between the inner pipe 93, the heat insulating member 95 and the outer pipe 92. In addition, the adiabatic spaces 94, 102 existing doubly between the secondary exhaust cleaner 85 and the outer pipe 92 promise an effective prevention of thermal damage relating to the secondary exhaust cleaner 85.

Next, a driving device for the intake control valve 35 and the exhaust control valve 55 will be described with reference to FIG. 1 and FIG. 18 to FIG. 20.

As shown in FIG. 1 and FIG. 18, on the upper side of the crankcase 10 of the engine En, a common actuator 71 between a pair of brackets 70, 70 is fixed to inside surfaces of the main frame 4 and mounted by a bolt 78 through an elastic member 77. The actuator 71 is disposed in a manner so that a first distance from the actuator 71 to the intake control valve 35 and a second distance from the actuator 71 to the exhaust control valve 55 are nearly equal to each other.

In the embodiment shown, the actuator 71 includes a normally and reversibly rotatable electric motor. The driving pulley 73 attached to an output shaft 72 of the motor is provided with a first wire groove 73a having a small diameter and second and third transmission wire grooves 73b, 73c having a large diameter.

A first transmission wire 75a is engaged with the first wire groove 73a and a wire groove 46a of the driven pulley 46 (See FIG. 6) on the side of the intake control valve 35. End terminals of the first transmission wire 75a are connected to the driving and driven pulleys 73, 46, respectively. Second and third transmission wires 75b, 75c are engaged with the second and third wire grooves 73b, 73c and a pair of wire grooves 67b, 67c of the driven pulley 67 (See FIG. 9) on the side of the exhaust control valve 55 in opposite wrap-around directions. End terminals of the second and third transmission wires 75b, 75c are connected to the driving pulley 73 and the driven pulley 67.

An electronic control unit 76 connected to the actuator 71 determines and detects a low-speed rotation range, an intermediate-speed rotation range and a high-speed rotation range of the engine En based on the revolution rate of the engine En, boost negative pressure and the like inputted from sensors (not shown). The ECU 76 controls the actuator 71 on the basis of the monitored results.

In the medium-speed rotation range of the engine En, the actuator 71 holds the driving pulley 73 in an initial position a. In the low-speed rotation range, the actuator 71 drives the driving pulley 73 to a first driving position b spaced from the initial position a by a predetermined angle along a reverse rotation direction R. In the high-speed rotation range, the actuator 71 drives the driving pulley 73 to a second driving position c spaced from the first driving position b by a predetermined angle in a forward rotation direction F via the initial position a.

Next, operation of a preferred embodiment will be described with reference to the accompanying drawings.

When the driving pulley 73 is driven by the actuator 71 to the first driving position b in the low-speed rotation range of the engine En, the driving pulley 73 pulls the first and second transmission wires 75a, 75b, whereby the driven pulley 46 on the side of the intake control valve 35 is rotated by a predetermined angle in a valve-opening direction (in FIG. 6, counterclockwise). The driven pulley 67 on the side of the exhaust control valve 35 is rotated by a predetermined angle counterclockwise in FIG. 8, thereby resulting in the valve body 57 of the exhaust valve 35 being brought into the low-speed control position C of FIG. 9 and FIG. 10.

However, the rotation by the predetermined angle of the driven pulley 46 is carried out within the range of the play angle α between the driven pulley 73 and the intake control valve 35 in the lost motion mechanism 42. Therefore, the valve plate 36 of the intake control valve 35 is maintained in the first intake control position A by the urging force of the return spring 41.

In this condition of the intake control valve 35, as shown in FIG. 2, the large-section passage 33b is fully closed by the valve plate 36. Therefore, air taken into the engine En is forced to flow through the small-section passage 33a when passing through the air cleaner 17. Therefore, even at the time of an accelerating operation in this low-speed rotation range (when the throttle valve 29 is opened abruptly), dilution of the mixture gas is suppressed, and an appropriately rich mixture gas can be supplied to the engine En. Accordingly, favorable acceleration performance is achieved even during rapid accelerations/starts.

However, when the valve body 57 of the exhaust control valve 55 comes to the low-speed control position C of FIG. 9 and FIG. 10, as has been described hereinabove, the communication hole 57b of the valve body 57 overlaps with the inlet port 56a of the valve housing 56. Further, while one end side of the through-hole 57a of the valve body overlaps with the communication hole 56e of the valve housing 56, the valve wall 57A of the valve body 57 closes up the outlet port 56b.

Therefore, the exhaust gas flowing from the upstream side of the first and fourth exhaust pipes 51a, 51d through the inlet port 56a of the valve housing 56 into the valve chamber 56c is blocked by the valve wall 57A of the valve body 57. Instead, the exhaust gas flowing through the upstream side of the first and fourth exhaust pipes 51a, 51d is turned to the side of the communication port 56d, and joins the exhaust gas flowing from the upstream side of the No. 2 and No. 3 exhaust pipes 51b, 51c and passing through the communication port 56d.

Due to a resulting, increased exhaust resistance, an exhaust pressure suitable for the low-speed rotation range is applied from the exhaust pipes 51a to 51d to the engine En. Therefore, during a valve overlap period, blow-off of fresh gas from the cylinders 50a to 50d to the exhaust system is restrained, and enhancement of low-speed output performance can be achieved.

The exhaust gas passing through the communication port 56d of the valve housing 56 flows through the downstream side of the No. 2 and No. 3 exhaust pipes 51b, 51c into the lower first exhaust collecting pipe 52b. Here, this exhaust gas joins another portion of exhaust gas flow, and is cleaned by the primary exhaust cleaner 84. Therefore, the entire amount of exhaust gas from the engine En flows through the primary exhaust cleaner 84.

Since the primary exhaust cleaner 84 is kept warm as described hereinabove, the primary exhaust cleaner 84 is quickly activated by exhaust heat and reaction heat even immediately after the engine En is started. The exhaust gas which has passed through the lower first exhaust collecting pipe 52b flows into the second exhaust collecting pipe 53, where it is further clarified by the secondary exhaust cleaner 85. Since the secondary exhaust cleaner 85 also is kept warm, activation thereof can be accelerated as well.

Thus, in the low-speed operation range of the engine En, all of the engine's exhaust gas is clarified by the primary and secondary exhaust cleaners 84, 85, so that clarification efficiency can be enhanced even when the exhaust gas temperature is comparatively low.

Meanwhile, the downstream side of the No. 1 and No. 4 exhaust pipes 51a, 51d is closed up by the valve wall 57A of the valve body 57, and the exhaust gas is prevented from flowing into the upper first exhaust collecting pipe 52a, so that it is unnecessary to provide an exhaust cleaner in the upper first exhaust collecting pipe 52a.

Then, when the engine En operates within the medium-speed rotation range and the driving pulley 73 is returned to the initial position a by the actuator 71, the driving pulley 73 relieves the first transmission wire 75a and pulls the third transmission wire 75c. By the relaxation of the first transmission wire 75a, the driven pulley 46 on the side of the intake control valve 35 is only returned to the initial position of FIG. 6 in the range of the play angle α under the urging force of the lost motion spring 45. Therefore, there is no change in the first intake control position A of the intake control valve 35.

However, by the rotation of the driven pulley 67 on the side of the exhaust control valve 35 due to pulling of the third transmission wire 75c, the valve body 57 is brought to the medium-speed control position D of FIG. 11. As a result, as has been described hereinabove, the through-holes 57a of the valve body 57 coincide with the inlet and outlet ports 56a, 56b, and the valve wall 57A closes up the communication hole 56e, so that the No. 1 to No. 4 exhaust pipes 51a, 51d are in an individually conducting condition.

Particularly, the through-holes 57a of the valve body 57 coincide with the No. 1 and No. 4 exhaust pipes 51a, 51d via the inlet port 56a and the outlet port 56b, so that the conduits of the No. 1 and No. 4 exhaust pipes 51a, 51d can be provided with a uniform cross section over the entire length thereof. The arc-shaped recess portions 57c of the outer surface of the valve wall 57A of the valve body 57 fronting on the communication holes 56e of the valve housing 56 are in continuation with the internal circumferential surfaces of the communication ports 56d.

The communication ports 56d are originally made to coincide with the conduits of the No. 2 and No. 3 exhaust pipes 51b, 51c. Therefore, the conduits of the No. 2 and No. 3 exhaust pipes 51b, 51c can be provided with a uniform cross section over the entire length thereof. Accordingly, in the No. 1 to No. 4 exhaust pipes 51a to 51d, it is possible to obtain an effective exhaust inertial effect and/or exhaust pulsation effect by utilizing the entire lengths of the exhaust pipes.

Namely, the effective pipe length of each of the exhaust pipes 51a to 51d is a maximum from the engine En to the upper and lower first exhaust collecting pipes 52a, 52b. The maximum pipe lengths are set so that the exhaust inertia effect and/or exhaust pulsation effect enhances the volumetric efficiency of the engine En in the medium-speed rotation range. Therefore, it is possible to enhance medium-speed output performance of the engine En.

Further, when the engine En operates within the high-speed rotation range and the driving pulley 73 is driven to the second driving position c by the actuator 71, the driving pulley 73 pulls the first and second transmission wires 75a, 75b with a greater force than the remaining operating ranges. By this relatively larger tensile force of the first transmission wire 75a, the driven pulley 46 on the side of the intake control valve 35 is rotated in a valve-opening direction in large excess of the play angle α. This action brings one end wall of the arc groove 44 into contact with the transmission pin 43 of the intake control valve 35, and brings the valve plate 36 of the intake control valve 35 to the second intake control position B of FIG. 3.

Due to the larger tensile force of the second transmission wire 75b, the driven pulley 67 on the side of the exhaust control valve 35 is rotated by about 180 degrees from the medium-speed control position D via the low-speed control position C. This final position is shown as the valve body's 57 high-speed control position E of FIG. 12.

When the valve plate 36 of the intake control valve 35 reaches the second intake control position B, as shown in FIG. 3, the valve plate 36 fully opens the large-section passage 33b, so that air taken into the engine En can flow through both the large-section passage 33b and the small-section passage 33a when passing through the air cleaner 17. Therefore, intake resistance is reduced, and volumetric efficiency of the engine En is enhanced, thereby contributing to enhancement of high-speed output performance.

However, when the valve body 57 of the exhaust control valve 55 reaches the high-speed control position E of FIG. 12, the through-holes 57a of the valve body 57 coincide with the inlet and outlet ports 56a, 56b of the valve housing 56, and the communication holes 57b of the valve body 57 coincide with the communication holes 56e of the valve housing 56, as has been described hereinabove.

Although the communication conditions of the No. 1 to No. 4 exhaust pipes 51a to 51d are not changed, intermediate portions of the No. 1 and No. 4 exhaust pipes 51a, 51d and the No. 2 and No. 3 exhaust pipes 51b, 51c are respectively communicated via the through-holes 56e, 56e and 57b, 57b.

Accordingly, the effective pipe length of each of the exhaust pipes 51a to 51d is minimized from the engine En to the exhaust control valve 55. The minimum effective pipe lengths are set so that the exhaust inertial effect and/or exhaust pulsation effect enhances the volumetric efficiency of the engine En in the high-speed rotation range. Accordingly, it is possible to enhance high-speed output performance of the engine En.

In the medium-speed to high-speed operation ranges of the engine En, the exhaust gases having passed through the No. 1 and No. 4 exhaust pipes 51a, 51d join each other in the upper first exhaust collecting pipe 52a and flow toward the second exhaust collecting pipe 53. Concurrently, the exhaust gases having passed through the No. 2 and No. 3 exhaust pipes 51b, 51c join each other in the lower first exhaust collecting pipe 52b and are cleaned by the primary exhaust cleaner 84, before flowing toward the second exhaust collecting pipe 53.

All the exhaust gases join one another in the second exhaust collecting pipe 53, before being cleaned by the secondary exhaust cleaner 85. Therefore, the exhaust gases having passed through the No. 1 and No. 4 exhaust pipes 51a, 51d are cleaned only by the secondary exhaust cleaner 85. However, this is not problematic since the flow rate of exhaust gas in the medium-speed to high-speed operation ranges is comparatively high, and the cleaning function of the secondary exhaust cleaner 85 is sufficiently enhanced by large quantities of exhaust heat and reaction heat that ensure effective cleaning of the exhaust gas.

The engine's En intake system In and exhaust system Ex are arranged with various functional requirements dependent upon the engine operating speed. Therefore, output performance of the engine En can be effectively enhanced over low-speed to high-speed rotation ranges of the engine En.

When the actuator 71 returns the driving pulley 73 from the second driving position c to the first driving position b again, the driven pulley 46 and the valve plate 36 of the intake control valve 35 are returned to the first intake control position A of FIG. 2. This is accomplished by urging forces of the lost motion spring 45 and the return spring 41 at around the time when the exhaust control valve 35 is brought from the high-speed control position E to the low-speed control position located at an intermediate point. Thereafter, the driven pulley 46 can continue a returning rotation in the range of the play angle α of the lost motion mechanism 42, and the exhaust control valve 35 can rotate past the low-speed control position to the medium-speed control position D.

Therefore, even if there is a large difference between the rotation angle of the intake control valve 35 and that of the exhaust control valve 55, the difference is absorbed by the lost motion mechanism 42. Accordingly, both the control valves 35, 55 can be properly operated by the common actuator 71.

The rotation of the driving pulley 73 which operates the exhaust control valve 35 between the low-speed control position and the medium-speed control position D is absorbed by the lost motion mechanism 42, thereby eliminating deleterious effects on the intake control valve 35 located at the first intake control position A.

Therefore, the valve body 57 of the exhaust control valve 55 can be operated freely between the low-speed control position C, medium-speed control position D and high-speed control position E. By providing the common actuator 71 for both the intake and exhaust control valves 35 and 55, the structure of a driving system for the control valves 35 and 55 is simplified. This further achieves enhancement of engine performance, reduction of cost, and reduction in weight.

Meanwhile, in the exhaust control valve 55, the bearing bushing 60 on the side of the driven pulley 67 of the valve housing 56, as has been described hereinabove, not only supports the valve shaft 62 on one side of the valve body 57, but also receives one end face of the valve body 57 urged to the side of the bearing bushing 60 by the load of the thrust spring 83. Therefore, the bearing bushing 60 and the valve body 57 are maintained in a pressure contact seal condition.

The portion between the valve body 57 and the bearing bushing 60 can be sealed without using any special seal member, and leakage of exhaust gas from the vicinity of the valve shaft 62 can be prevented. In addition, since expensive seal members are unnecessary, the number of component parts is reduced and cost reductions can be achieved. Furthermore, the absence of seal members allows a bearing bushing 60 longer in the axial direction to be mounted in the bearing bracket 58 in order to achieve a large bearing capacity for bearing the valve shaft 62 in a broad range.

Therefore, the bearing bushing 60 can firmly support the valve shaft 62 and can display excellent durability even though it directly receives load from the driven pulley 67 fitted to the valve shaft 62.

Where the bearing bushing 60, particularly on the side of pressure contact with one end face of the valve body 57, is formed from a nonmetallic material such as carbon graphite, good sealing property can be attained. Further, vibrations in the thrust direction of the valve body 57 due to exhaust pulsation can be absorbed, whereby generation of abnormal noise can be suppressed.

Furthermore, the valve housing 56 and the valve body 57 provided integrally with the valve shafts 61, 62 are formed from a titanium material, which greatly contributes to reduction of weight of the exhaust control valve. In addition, though the titanium material forming the valve body 57 is an active metal and normally has a high tendency toward seizure, the adoption of the bearing bushings 59, 60 made of a carbon material ensure that good rotational movement can be provided between the valve shafts 61, 62 and the bearing bushes 59, 60 in even high-temperature conditions. This arrangement, in cooperation with the reduction of weight of the valve body 57, permits an enhanced response to driving torque.

The present invention is not limited to or by the embodiments above, and various design modifications can be made without departure from the spirit and scope of the invention. For example, the intake control valve 35 can be constructed so that the effective pipe length of the intake system In is changed according to the operating condition of the engine En. The invention can also be applied to a two-cylinder engine, where the two exhaust pipes are controlled by the exhaust control valve 55 in the same manner as the No. 1 and No. 4 exhaust pipes 51a, 51d and the No. 2 and No. 3 exhaust pipes 51b, 51c in the above embodiment. Naturally, the invention can be applied also to other multi-cylinder engines.

As has been described hereinabove, according to a first feature of the present invention, the valve body of the exhaust valve is urged by a spring for achieving a pressure contact seal condition between the opposed end faces of the bearing bush and the valve body. Therefore, the bearing bushing is provided not only with a bearing function but also with a sealing function. Accordingly, it is unnecessary to provide an expensive seal member and the number of component parts is reduced, whereby reduction of cost can be realized.

In addition, the absence of seal members makes it possible to use a bearing bushing longer in the axial direction, and to secure a large bearing capacity for bearing a valve shaft over a broad range. Accordingly, the bearing bush can display excellent durability even though it directly receives load from the driven pulley fitted to the valve shaft.

According to a second feature of the invention, the bearing bushing is made of a nonmetallic material, so that a superior sealing property can be attained. In addition, vibrations in the thrust direction of the valve body due to exhaust pulsations can be absorbed, while generation of abnormal noise can be suppressed.

Furthermore, according to a third feature of the invention, the valve body is formed from a titanium material together with its valve shafts, while the bearing bushes are formed from a carbon material. Therefore, it is possible to achieve a reduction in weight of the valve body. In addition, this arrangement provides good rotational slidability between the valve shafts and the bearing bushes even in high-temperature conditions. This, in cooperation with the reduction of weight of the valve body, makes it possible to effectively enhance response properties of the valve body to driving torque.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust control valve for an internal combustion engine for a vehicle comprising:
   a valve housing having a valve chamber;
   a valve body rotatably contained in the valve chamber and cooperatively engaged with said valve housing for controlling a flow of exhaust gas;
   a rotating transmission member drivingly engaging at least one valve shaft of said valve body, said transmission member secured to an outer end of said at least one valve shaft protruding from an exterior of said valve housing;
   a bearing bushing having a pair of opposed end faces and rotatably bearing an external circumferential surface of said valve shaft by an internal circumferential surface of said bearing bushing, said bearing bushing rotatably bearing an end face of said valve body around an entire circumference thereof, said opposed end faces including an inner end face and an outer end face, said inner end face being closer to said valve body than said outer end face; and
   a spring operatively engaged with said valve body and maintaining a pressure seal, direct contact condition between the inner end face of said bearing bushing and said end face of said valve body around the entire circumference thereof, said spring being located outside of said bearing bushing.

2. The exhaust control valve according to claim 1, wherein said bearing bushing is formed from a nonmetallic material.

3. The exhaust control valve according to claim 1, said valve housing having at least one pair of inlet ports and at least one pair of outlet ports.

4. The exhaust control valve according to claim 1, wherein a driven pulley connected to at least one drive shaft is drivingly engaged through said transmission member, said transmission member having a second and a third transmission wire operatively connected with an actuator.

5. The exhaust control valve according to claim 1, further comprising a gap being formed between an end wall of the valve housing and said valve body, said end wall of the valve housing being on a side of the valve body opposite to said rotating transmission member.

6. The exhaust control valve according to claim 1, wherein said bearing bushing rotatably bears on said external circumferential surface of said valve shaft by said internal surface of said bearing bushing along an entire length of said bearing bushing.

7. The exhaust control valve according to claim 1, wherein said bearing bushing is formed from a carbon material.

8. The exhaust control valve according to claim 7, wherein said valve body and each of said valve shafts are formed from a titanium material.

9. The exhaust control valve according to claim 1, wherein said valve body and each valve shaft have a uniform construction with a one-piece, unitary cast body.

10. The exhaust control valve according to claim 9, wherein at least one drive shaft has a driven pulley attached to a tip end portion of the valve shaft.

11. The exhaust control valve according to claim 10, wherein the driven pulley is driven by a driving pulley of an actuator.

12. The exhaust control valve according to claim 11, wherein the actuator is operatively engaged and controls an intake control system and said exhaust control valve.

13. An exhaust control valve for an internal combustion engine for a vehicle comprising:
    a valve housing having a valve chamber;
    a valve body rotatably contained in the valve chamber and cooperatively engaged with said valve housing for controlling a flow of exhaust gas;
    a rotating transmission member drivingly engaging at least one valve shaft of said valve body, said transmission member secured to an outer end of said at least one valve shaft protruding from an exterior of said valve housing;

a non-metallic, cylindrically shaped bearing bushing having a pair of opposed end faces and rotatably bearing an external circumferential surface of said valve shaft by an internal circumferential surface of said bearing bushing, said bearing bushing rotatably bearing an end face of said valve body around an entire circumference thereof;

a spring operatively engaged with said valve body and maintaining a pressure seal, direct contact condition between an end face of said bearing bushing and said end face of said valve body around the entire circumference thereof, said spring being located outside of said bearing bushing; and a bearing bracket securing said spring and said bearing bushing in a position between said bearing bracket and said end face of said valve body.

14. The exhaust control valve according to claim 13, wherein said bearing bushing rotatably bears on said external circumferential surface of said valve shaft by said internal surface of said bearing bushing along an entire length of said bearing bushing.

15. An exhaust control system for an internal combustion engine of a vehicle comprising:

a plurality of exhaust pipes each having an intermediate portion;

an exhaust gas muffler operatively connected to said exhaust pipes;

a valve housing disposed in the intermediate portion of said exhaust pipes and having a valve chamber;

a valve body rotatably contained in the valve chamber and cooperatively engaged with said valve housing for controlling a flow of exhaust gas;

a rotating transmission member drivingly engaging at least one valve shaft of said valve body, said transmission member secured to an outer end of said at least one valve shaft protruding from an exterior of said valve housing;

a bearing bushing for rotatably bearing an external circumferential surface of said valve shaft by an internal circumferential surface of said bearing bushing, said bearing bushing rotatably bearing and in contact with an end face of said valve body around an entire circumference thereof; and a thrust spring operatively engaged with said valve body and maintaining a pressure seal, direct contact condition between an end face of said bearing bushing and said end face of said valve body around the entire circumference thereof, said thrust spring being located outside of said bearing bushing.

16. The exhaust control system according to claim 15, further comprising a plurality of front and rear flanges at a front end and a rear end of the valve housing, respectively.

17. The exhaust control valve according to claim 15, wherein said valve body and each valve shaft have a uniform construction with a one-piece, unitary cast body.

18. The exhaust control system according to claim 15, further comprising a gap being formed between an end wall of the valve housing and said valve body, said end wall of the valve housing being on a side of the valve body opposite to said rotating transmission member.

19. The exhaust control system according to claim 15, wherein said bearing bushing rotatably bears on said external circumferential surface of said valve shaft by said internal surface of said bearing bushing along an entire length of said bearing bushing.

20. The exhaust control system according to claim 15, wherein at least one drive shaft has a driven pulley attached to a tip end portion of the valve shaft.

21. The exhaust control system according to claim 20, wherein the driven pulley is driven by a driving pulley of an actuator.

22. The exhaust control system according to claim 15, wherein a driven pulley connected to at least one drive shaft is drivingly engaged through said transmission member, said transmission member having a second and a third transmission wire operatively connected with an actuator.

23. The exhaust control system according to claim 22, wherein the actuator is operatively engaged and simultaneously controls an intake control system and said exhaust control system.

24. The exhaust control system according to claim 23, wherein said actuator selectively sets an operating position of said valve body to a low speed control setting, a medium speed control setting, or a high speed control setting.

25. The exhaust control system according to claim 24, wherein said exhaust pipes include a first exhaust gas cleaner and a second exhaust gas cleaner, and the operating position of said valve body controls a volume of exhaust gas flow that passes through each of said exhaust gas cleaners.

* * * * *